(12) United States Patent
Oyaizu et al.

(10) Patent No.: US 11,663,708 B2
(45) Date of Patent: May 30, 2023

(54) IMAGE PROCESSING APPARATUS, IMAGING APPARATUS, AND IMAGE PROCESSING METHOD

(71) Applicant: SONY CORPORATION, Tokyo (JP)

(72) Inventors: Hideki Oyaizu, Tokyo (JP); Ilya Reshetouski, Tokyo (JP); Atsushi Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 376 days.

(21) Appl. No.: 16/976,742

(22) PCT Filed: Dec. 6, 2018

(86) PCT No.: PCT/JP2018/045005
§ 371 (c)(1),
(2) Date: Aug. 28, 2020

(87) PCT Pub. No.: WO2019/171691
PCT Pub. Date: Sep. 12, 2019

(65) Prior Publication Data
US 2020/0410654 A1    Dec. 31, 2020

(30) Foreign Application Priority Data
Mar. 6, 2018  (JP) .............................. JP2018-039315

(51) Int. Cl.
*G06T 5/50*   (2006.01)
*G02B 5/30*   (2006.01)
(Continued)

(52) U.S. Cl.
CPC .............. *G06T 5/50* (2013.01); *G02B 5/3025* (2013.01); *G06T 5/001* (2013.01); *H04N 23/62* (2023.01); *H04N 23/69* (2023.01)

(58) Field of Classification Search
CPC ....................... G06T 5/50; G06T 5/001; G06T 2207/10052; G06T 1/0007; G06T 2200/21;
(Continued)

(56) References Cited

U.S. PATENT DOCUMENTS 7,738,344 B2 *  6/2010  Ooi ....................... G11B 7/1374
                                                    369/112.02
8,593,631 B2 * 11/2013  Hirai ....................... G01J 3/0224
                                                    356/521
(Continued)

FOREIGN PATENT DOCUMENTS

CA        2608377 A     11/2006
CN     101228460 A      7/2008
(Continued)

OTHER PUBLICATIONS

Office Action for CN Patent Application No. 201880090500.5, dated Apr. 6, 2022, 04 pages of English Translation and 04 pages of Office Action.
(Continued)

*Primary Examiner* — Michael S Osinski
(74) *Attorney, Agent, or Firm* — Chip Law Group

(57) ABSTRACT

A field of view of a captured image of a lensless camera can be controlled, and a configuration of generating a restored image including part of an imaging region is realized. Included is a signal processing unit that receives observed image signals as output of an image sensor of a lensless camera to generate a restored image of a restored image region including part of a captured image region of the lensless camera. The signal processing unit includes: a restored image region corresponding mask matrix calculation unit that calculates a restored image region corresponding mask matrix applied to generate the restored image; and an image estimation unit that subtracts observed image signals outside of the restored image region not included in
(Continued)

the restored image region from the observation image signals to calculate observed image signals inside of the restored region and that executes arithmetic processing of the observed image signals inside of the restored region and a pseudo-inverse matrix or an inverse matrix of the restored image region corresponding mask matrix to generate the restored image.

10 Claims, 21 Drawing Sheets

(51) Int. Cl.
*G06T 5/00* (2006.01)
*H04N 23/62* (2023.01)
*H04N 23/69* (2023.01)

(58) Field of Classification Search
CPC ............... G02B 5/3025; G02B 27/58; G02B 2207/129; G02B 3/08; H04N 23/62; H04N 23/69; H04N 23/55; H04N 23/80; H04N 5/2254; H04N 5/23229; H04N 5/232; H04N 5/23232; H04N 5/217; H04N 5/22541; H04N 5/225; H04N 5/238; H04N 5/335; H04N 5/357
See application file for complete search history.

(56) References Cited

U.S. PATENT DOCUMENTS

| | | | |
|---|---|---|---|
| 9,450,033 B2* | 9/2016 | Suh | H01L 27/3234 |
| 10,551,532 B2* | 2/2020 | Nakamura | G02B 27/0087 |
| 11,288,780 B2* | 3/2022 | Kishine | H04N 5/22541 |
| 11,399,134 B2* | 7/2022 | Ito | G06T 5/004 |
| 2006/0157640 A1* | 7/2006 | Perlman | H04N 5/357 |
| | | | 348/E5.079 |
| 2009/0095912 A1* | 4/2009 | Slinger | G02B 27/00 |
| | | | 250/363.06 |
| 2011/0085051 A1* | 4/2011 | Chi | G02F 1/35 |
| | | | 348/222.1 |
| 2012/0147226 A1* | 6/2012 | Takatori | G06T 5/20 |
| | | | 348/246 |
| 2013/0093944 A1* | 4/2013 | Fukami | H04N 19/597 |
| | | | 348/360 |
| 2014/0071313 A1* | 3/2014 | Hiasa | G06T 5/50 |
| | | | 348/231.99 |
| 2014/0226041 A1 | 8/2014 | Eguchi et al. | |
| 2016/0119606 A1* | 4/2016 | Horikawa | G06T 5/50 |
| | | | 348/46 |
| 2016/0255294 A1* | 9/2016 | Hiasa | H04N 5/23235 |
| | | | 348/302 |
| 2016/0275328 A1* | 9/2016 | Schatt | G06K 7/1443 |
| 2017/0118489 A1* | 4/2017 | Berbecel | H04N 19/186 |
| 2017/0134672 A1* | 5/2017 | Gibbons | H04N 5/378 |
| 2017/0230575 A1 | 8/2017 | Endsley et al. | |
| 2017/0339363 A1* | 11/2017 | Hiasa | H04N 5/378 |
| 2019/0020789 A1* | 1/2019 | Shimano | H04N 5/2254 |
| 2019/0313018 A1* | 10/2019 | Ono | H04N 5/225 |
| 2020/0084350 A1* | 3/2020 | Kishine | H04N 5/232 |
| 2020/0084376 A1* | 3/2020 | Naruse | H04N 5/23229 |
| 2020/0209604 A1* | 7/2020 | Chen | G02B 21/008 |

FOREIGN PATENT DOCUMENTS

| | | |
|---|---|---|
| CN | 102740127 A | 10/2012 |
| CN | 103685922 A | 3/2014 |
| JP | 2008-542863 A | 11/2008 |
| JP | 2009-171191 A | 7/2009 |
| JP | 2014-134792 A | 7/2014 |
| JP | 2016-096556 A | 5/2016 |
| JP | 2016-134732 A | 7/2016 |
| KR | 10-2008-0021040 A | 3/2008 |
| WO | 2006/125975 A1 | 11/2006 |
| WO | 2012/040192 A1 | 3/2012 |
| WO | 2014/010726 A1 | 1/2014 |

OTHER PUBLICATIONS

International Search Report and Written Opinion of PCT Application No. PCT/JP2018/045005, dated Feb. 26, 2019, 10 pages of ISRWO.

Office Action for CN Patent Application No. 201880090500.5, dated Jul. 28, 2021, 18 pages of English Translation and 14 pages of Office Action.

* cited by examiner

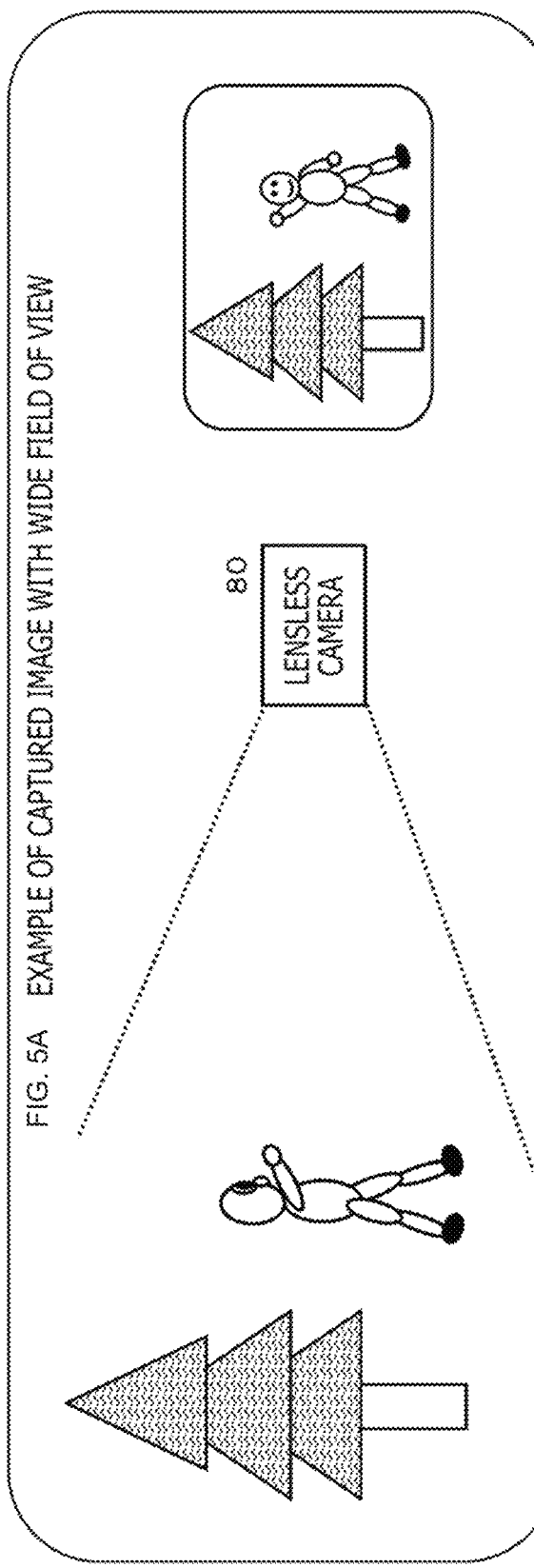
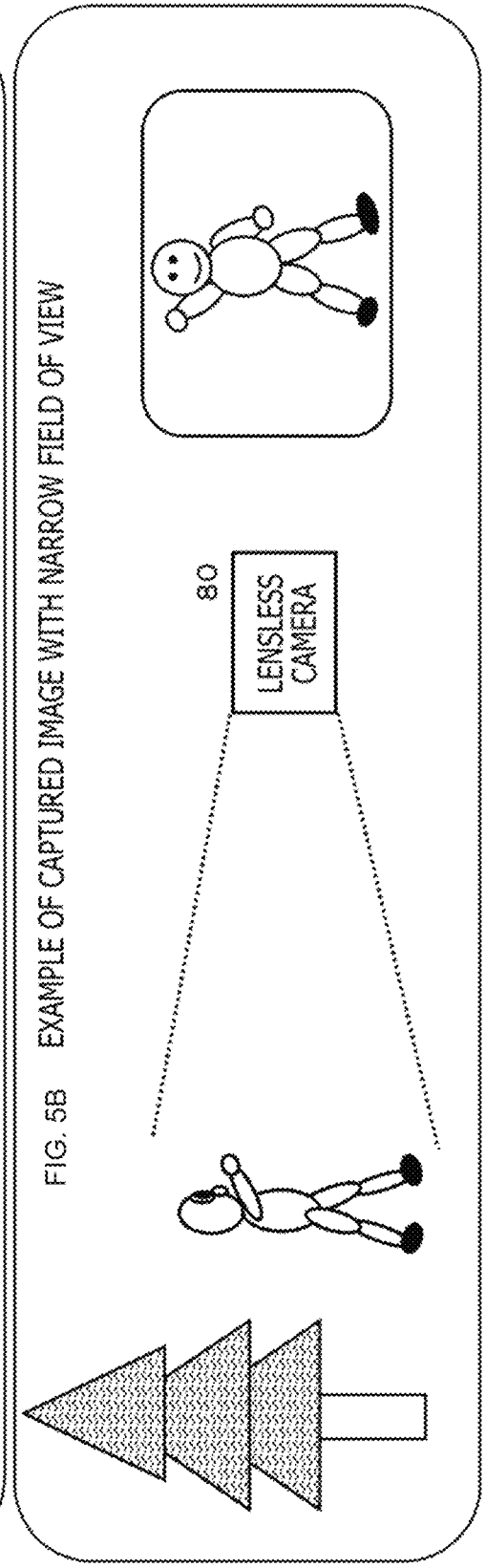

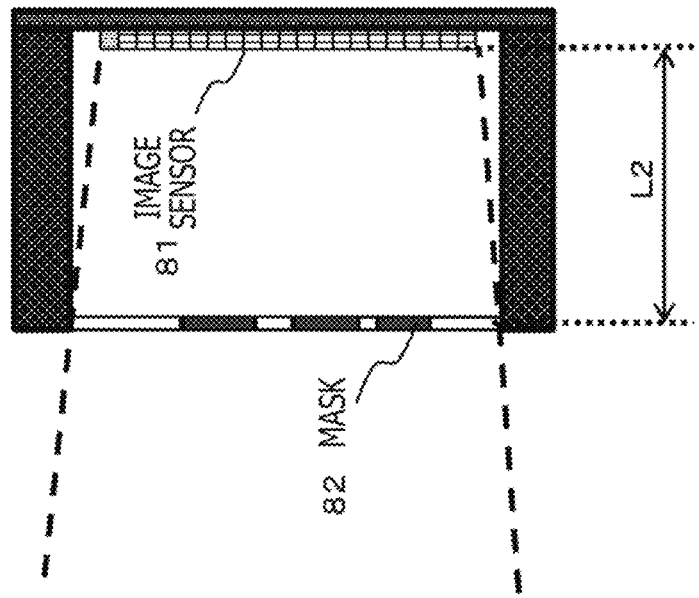
FIG. 6B FIELD OF VIEW (FOV) = NARROW
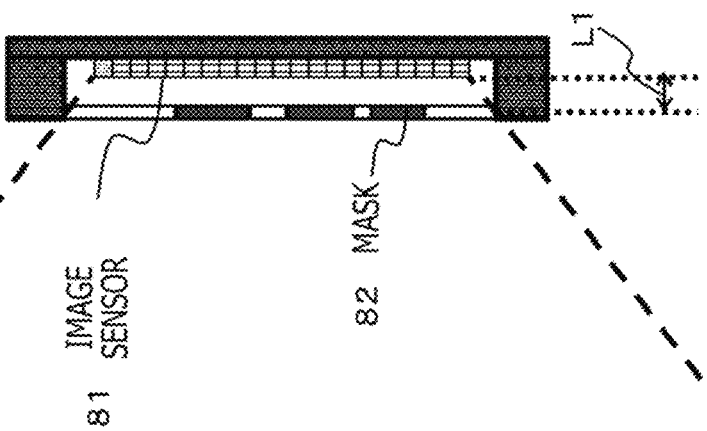
FIG. 6A FIELD OF VIEW (FOV) = WIDE

FIG. 7

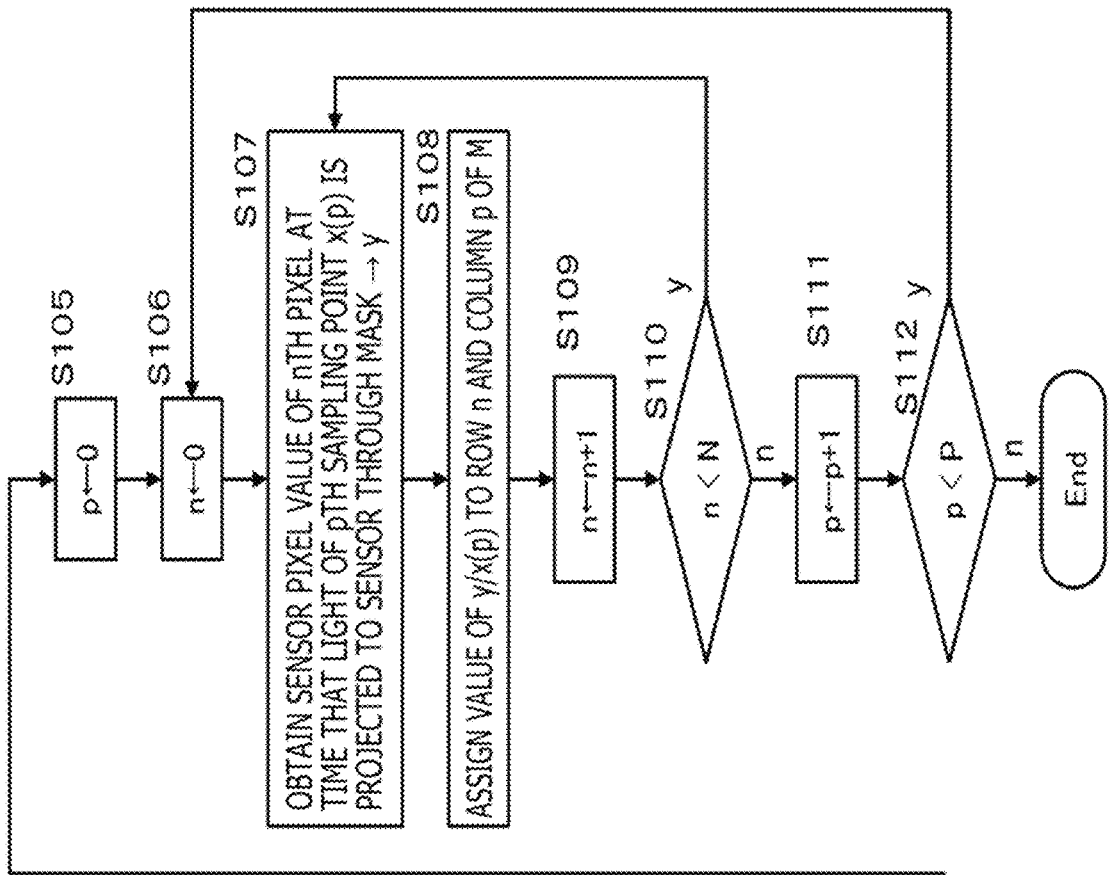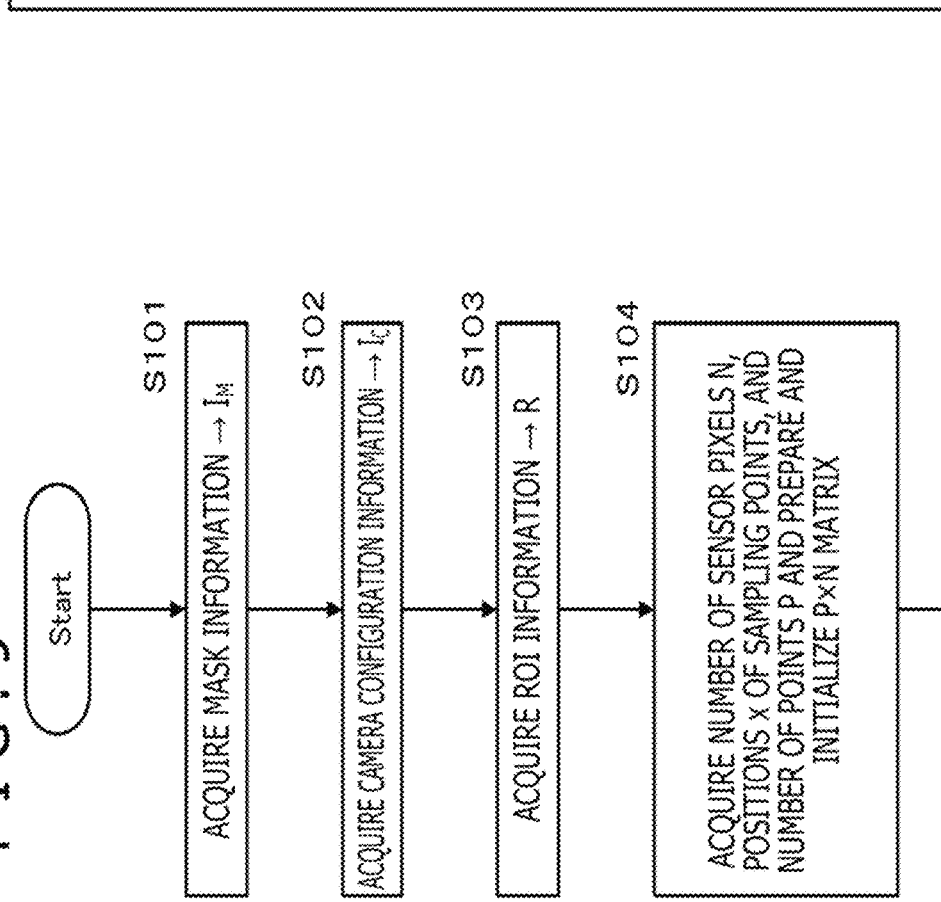
FIG. 9

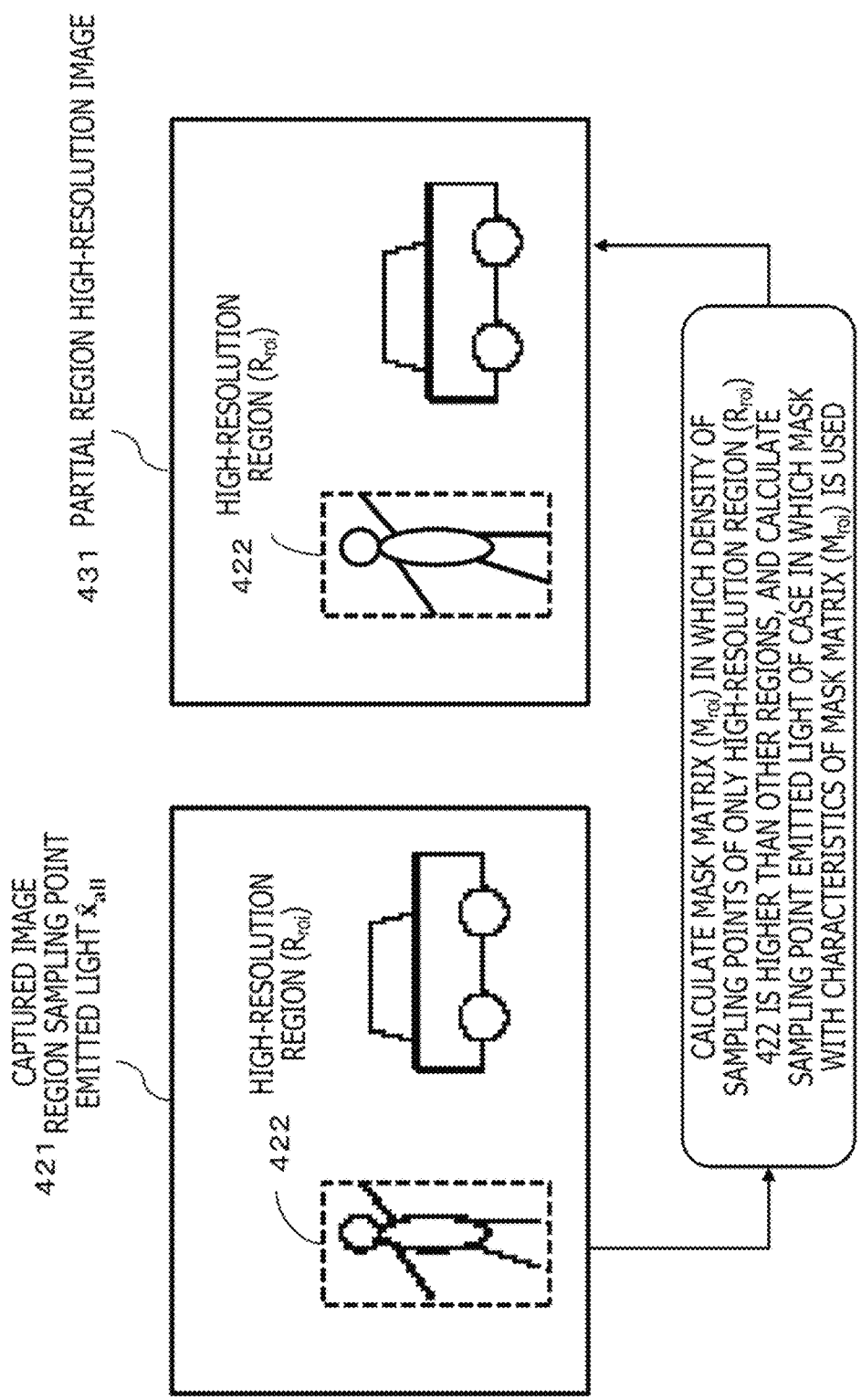

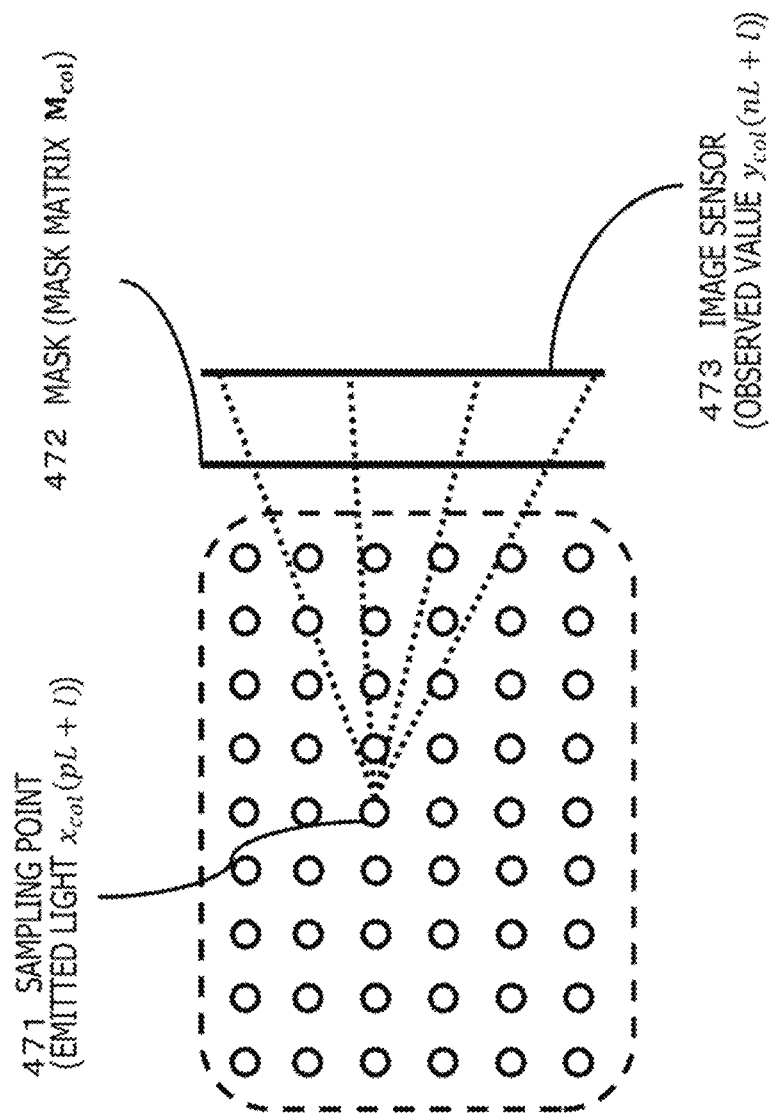

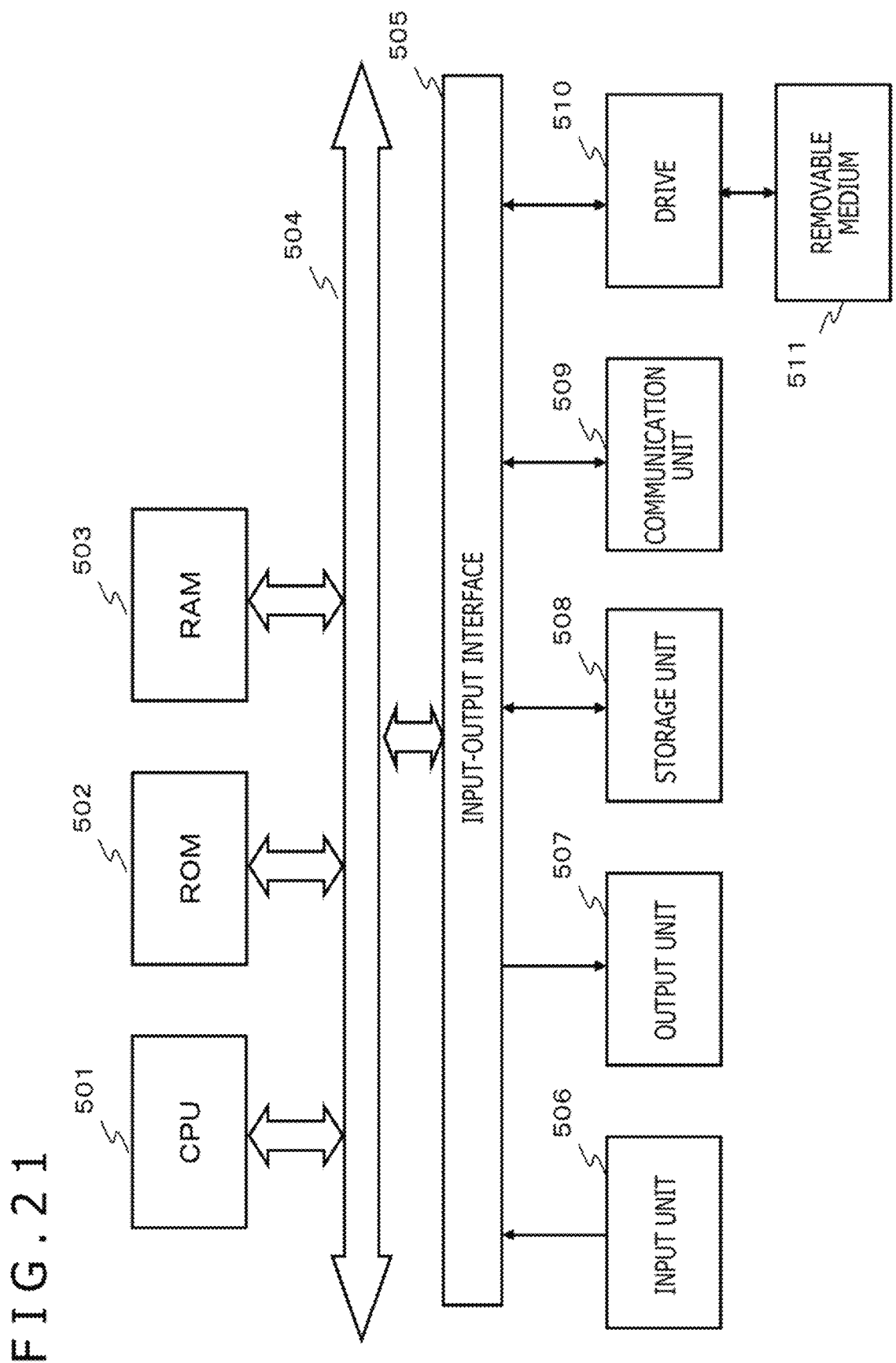

IMAGE PROCESSING APPARATUS, IMAGING APPARATUS, AND IMAGE PROCESSING METHOD

CROSS REFERENCE TO RELATED APPLICATIONS

This application is a U.S. National Phase of International Patent Application No. PCT/JP2018/045005 filed on Dec. 6, 2018, which claims priority benefit of Japanese Patent Application No. JP 2018-039315 filed in the Japan Patent Office on Mar. 6, 2018. Each of the above-referenced applications is hereby incorporated herein by reference in its entirety.

TECHNICAL FIELD

The present disclosure relates to an image processing apparatus, an imaging apparatus, and an image processing method. Particularly, the present disclosure relates to an image processing apparatus, an imaging apparatus, and an image processing method that can control a field of view of a captured image of a lensless camera (lensless imaging apparatus) and that generate a restored image including part of an imaging region.

BACKGROUND ART

In recent years, the development of a lensless camera that can capture an image without using a lens has been progressed. A conventional general camera inputs light transmitted through a lens into an image sensor as an imaging device to capture an image. In place of the lens, the lensless camera uses a mask in which transmission regions and non-transmission regions of light are set as a two-dimensional pattern and inputs the light transmitted through the mask into an image sensor. The image sensor captures an image through the mask. Predetermined image processing can be applied to captured data through the mask to generate a two-dimensional image corresponding to a captured scene similar to the general camera. The lensless camera does not require the lens, and downsizing and weight reduction of the imaging apparatus are realized.

As described above, the lensless camera inputs the light transmitted through the mask into the image sensor. Information indicating how the emitted light from the scene (captured scene) is transmitted through the mask and projected to the sensor is defined in advance as a matrix, and the matrix and the image (observed image) projected to the sensor are used to generate an image (restored image) in which the actual scene is reproduced.

Note that the lensless camera is described in, for example, the following literature.

PTL 1 (PCT Patent Publication No. WO2012/040192).

The following process executed is an example of a reconstruction process of the captured image for generating, from the image (observed image) projected to the image sensor of the lensless camera, the image (restored image) in which the actual scene is reproduced. The emitted light of the captured scene is expressed as luminance values of a plurality of three-dimensional sampling points, and a plurality of sets of sensor observed values projected to the image sensor through the mask is obtained in advance in a simulation or the like.

Furthermore, a mask matrix expressing a mask is calculated from the sets. An inverse matrix of the mask matrix is obtained, and the inverse matrix is applied to observed values, that is, pixel values of the image sensor of the lensless camera to thereby restore the luminance values of the sampling points included in the captured scene. The luminance values of the sampling points are luminance values indicating the image of the captured scene.

When the light emitted from the P three-dimensional sampling points is written as a scene emitted light vector x of the length P, and the observed values of the two-dimensional sensor corresponding to the number of pixels N that receive the light are expressed as a scene observed value vector y of the length N, the relationship can be represented as follows.

$$y=Mx$$

Here, M is a matrix representing a transmission function of the mask, that is, a mask matrix.

To reproduce the emitted light of the scene, x satisfying the relationship of the expression can be obtained from the sensor observed values y of the lensless camera. The resolution of the reproduced scene can be improved by increasing the number P of three-dimensional sampling points included in the scene. However, this increases the time it takes to estimate the scene emitted light vector x, and the reconstruction of image requires a long time.

In the expression, y=Mx indicates that all of the light entering the sensor of the lensless camera is superimposed on the sensor, and the field of view (FOV) of the restored image is significantly wide.

CITATION LIST

Patent Literature

[PTL 1]
PCT Patent Publication No. WO2012/040192

SUMMARY

Technical Problems

The field of view (FOV) of the lensless camera is wide, and the number of sampling points P expressing the entire scene is large. However, in the case where the lensless camera is used as a camera, it is often desirable to narrow down the FOV in some degree to limit the imaging range. Although it is possible to cut out only part of the captured image, there is a problem that the resolution is reduced in that case.

In addition, although there is the method of increasing the resolution by increasing the number of three-dimensional sampling points P that can be reproduced as a captured image as described above, there is a problem that the method increases the reconstruction time of image, and the method is not practical.

The present disclosure has been made in view of, for example, the problems described above, and an object of the present disclosure is to provide an image processing apparatus, an imaging apparatus, and an image processing method that can change a field of view (FOV) of a captured image captured by a lensless camera without reducing resolution or increasing an amount of calculation.

Solution to Problems

A first aspect of the present disclosure provides an image processing apparatus including a signal processing unit that receives observed image signals as output of an image sensor of a lensless camera to generate a restored image of a restored image region including part of a captured image region of the lensless camera, in which the signal processing unit generates the restored image by executing arithmetic processing of observed image signals in a restored region generated by subtracting observed image signals not included in the restored image region from the observed image signals and an inverse matrix or a pseudo-inverse matrix of a matrix applied to generate the restored image.

Furthermore, a second aspect of the present disclosure provides an imaging apparatus including: a mask in which transmission regions and non-transmission regions of light are set as a two-dimensional pattern; an imaging unit including an image sensor that receives the light through the mask; and a signal processing unit that receives observed image signals as output of the image sensor to generate a restored image of a restored image region including part of a captured image region of the imaging unit, in which the signal processing unit generates the restored image by executing arithmetic processing of observed image signals in a restored region generated by subtracting observed image signals not included in the restored image region from the observed image signals and an inverse matrix or a pseudo-inverse matrix of a matrix applied to generate the restored image.

Furthermore, a third aspect of the present disclosure provides an image processing method executed by an image processing apparatus, in which the image processing apparatus includes a signal processing unit that receives observed image signals as output of an image sensor of a lensless camera to generate a restored image of a restored image region including part of a captured image region of the lensless camera, and the signal processing unit generates the restored image by executing arithmetic processing of observed image signals in a restored region generated by subtracting observed image signals not included in the restored image region from the observed image signals and an inverse matrix or a pseudo-inverse matrix of a matrix applied to generate the restored image.

Note that other objects, features, and advantages of the present disclosures will become apparent from more detailed description based on an embodiment of the present disclosure described later and the attached drawings. Note that in the present specification, a system denotes logical set configurations of a plurality of apparatuses, and the apparatuses of the configurations may not be in the same housing.

Advantageous Effect of Invention

According to the configuration of the embodiment of the present disclosure, the field of view of the captured image of the lensless camera can be controlled, and the configuration of generating the restored image including part of the imaging region is realized. Note that the advantageous effect described in the present specification is illustrative only, and the advantageous effect is not limited. There may also be additional advantageous effects.

BRIEF DESCRIPTION OF DRAWINGS

FIGS. 5A and 5B are diagrams describing an example of setting a field of view of the lensless camera.

FIGS. 6A and 6B are diagrams describing an example of setting the field of view of the lensless camera.

FIG. 7 is a diagram describing a configuration and a process of an image processing apparatus that applies signal processing to a captured image of the lensless camera.

FIG. 9 is a diagram illustrating a flow chart describing a processing sequence executed by a mask matrix calculation unit of a signal processing unit.

FIG. 19 is a diagram describing the setting of the sampling points for acquiring the image with locally changed resolution and the captured image.

FIG. 20 is a diagram describing a processing example for acquiring an image of each wavelength unit.

FIG. 21 is a diagram describing an example of a hardware configuration of the image processing apparatus.

DESCRIPTION OF EMBODIMENTS

Hereinafter, details of an image processing apparatus, an imaging apparatus, and an image processing method of the present disclosure will be described with reference to the drawings. Note that the details will be described according to the following items.

1. Overview and Principle of Lensless Camera
2. Setting of Field of View in Lensless Camera
3. Configuration and Process of Image Processing Apparatus of Present Disclosure
4. Detailed Sequence of Mask Matrix Calculation Process in Mask Matrix Calculation Unit
5. Detailed Sequence of Image Estimation Process in Image Estimation Unit
6. Example of Setting Sampling Points and Example of Generating Image
7. Example of Generation Process of Image with Partially Improved Resolution
8. Processing Example of Dispersing Emitted Light from Sampling Points in Wavelength Direction
9. Advantageous Effects of Image Processing of Present Disclosure 10. Example of Hardware Configuration of Image Processing Apparatus 11. Conclusion of Configuration of Present Disclosure

[1. Overview and Principle of Lensless Camera]

First, an overview and a principle of a lensless camera will be described.

The overview of the lensless camera (lensless imaging apparatus) will be described by comparing the lensless camera with the configuration of a general camera (imaging apparatus) with reference to FIGS. 1 and 2.

Figure 1:
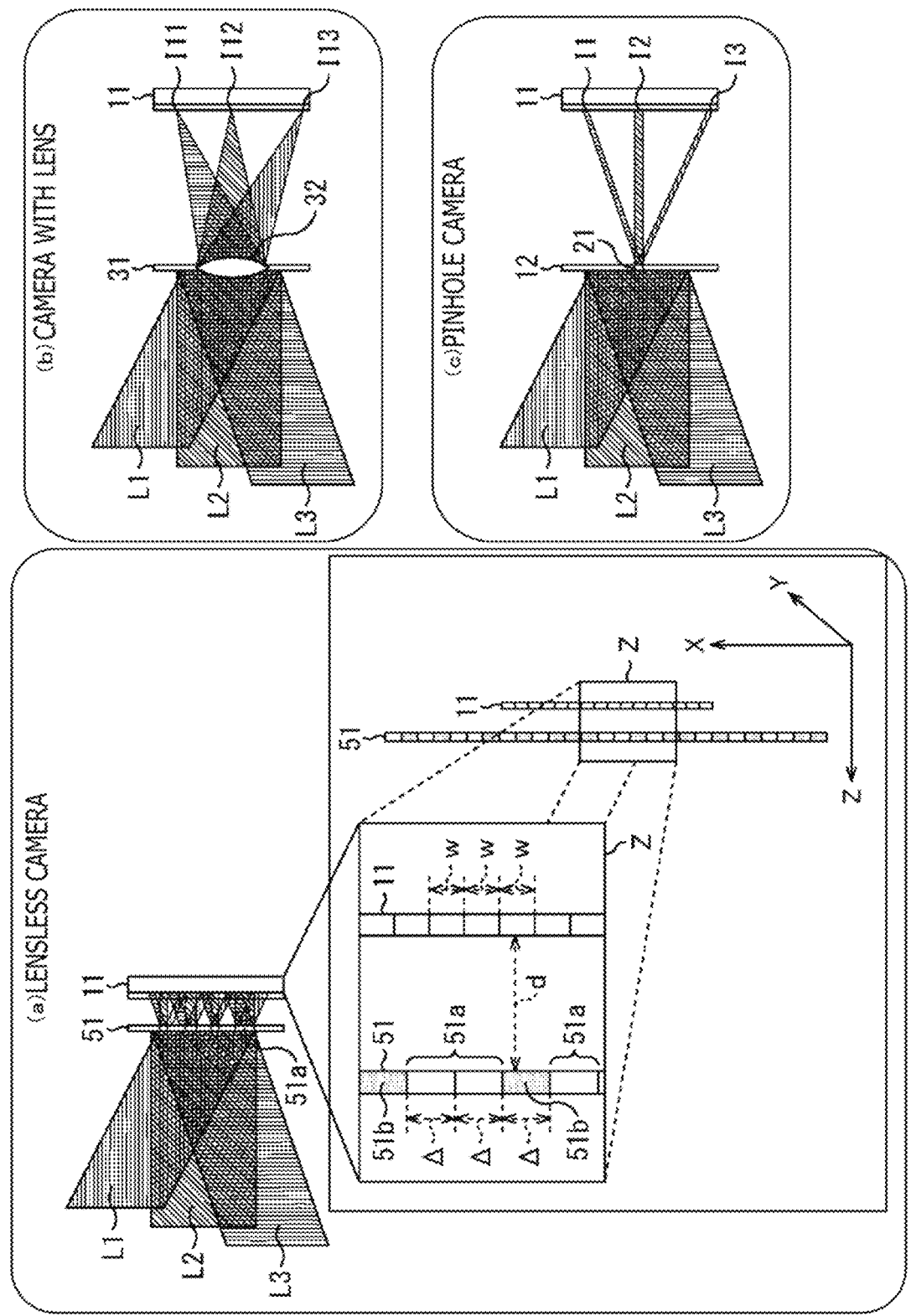
FIG. 1 is a diagram describing imaging principles of a lensless camera.

FIG. 1 illustrates imaging principles of the following three types of cameras.

(a) Lensless camera
(b) Camera with lens
(c) Pinhole camera (c) The pinhole camera includes: a pinhole 21 provided as a hole on a light shielding film 12; and an image sensor (solid-state imaging device) 11. In the case of the imaging apparatus including the pinhole, beams L1 to L3 emitted from different light sources on an object surface transmit through the pinhole 21, and images are formed at pixels I1 to I3 on the image sensor (solid-state imaging device) 11 as illustrated in the diagram of (c) the pinhole camera on the lower right of FIG. 1.

In the case of the imaging apparatus including the pinhole camera, the image is formed based only on the beam of one pixel among the beams L1 to L3 emitted from the light sources in the image sensor (solid-state imaging device) 11, and the image enters each pixel on the image sensor (solid-state imaging device) 11. Therefore, a dark image is captured.

(b) The camera with lens on the upper right of FIG. 1 is provided with an imaging lens 32 at the center of a light shielding film 31, and the imaging lens 32 condenses the beams L1 to L3 as indicated by beams I11 to I13. Images are formed on the image sensor (solid-state imaging device) 11, and the image sensor (solid-state imaging device) 11 captures the images.

As for the image sensor (solid-state imaging device) 11 in the case of (b) the camera with lens on the upper right of FIG. 1, an image is formed from light with light intensity equivalent to the total light intensity of all of the beams L1 to L3, and the image enters the image sensor (solid-state imaging device 11). Therefore, an image with sufficient amount of light is captured in each pixel of the image sensor (solid-state imaging device) 11.

As illustrated in the diagram of (b) the camera with lens on the upper right of FIG. 1, the imaging lens 32 is used, and a set of point light sources forms the subject. Therefore, in the imaging of the object, beams emitted from a plurality of point light sources on the object surface are condensed to form an image, and the object is imaged.

As described with reference to (b) the camera with lens on the upper right of FIG. 1, the role of the imaging lens 32 is to guide each beam, that is, diffused light, emitted from each of the point light sources to the image sensor (solid-state imaging device) 11. Therefore, an image equivalent to the final image is formed on the image sensor (solid-state imaging device) 11, and an image based on detection signals detected at the pixels on the image sensor (solid-state imaging device) 11 becomes an observed image obtained by forming the image.

However, the size of the imaging apparatus (imaging device) is determined by the imaging lens and the focal length of the imaging lens, and there is a limit to downsizing.

On the other hand, (a) the lensless camera illustrated on the left side of FIG. 1 is not provided with the imaging lens or the pinhole and uses the image sensor (solid-state imaging device) 11 and a mask 51 to image the object on the object surface.

(a) The lensless camera illustrated on the left side of FIG. 1 is provided with the mask 51, which includes openings 51a in a plurality of sizes, on an earlier stage of the image sensor 11, and the beams L1 to L3 from the light sources are modulated and enter the imaging surface of the image sensor 11. The pixels on the image sensor (solid-state imaging device) 11 receive the beams L1 to L3.

Here, the mask 51 is a mask including a mask pattern in which the sizes of the openings 51a and light-shielding portions 51b are randomly set in the horizontal direction and the vertical direction in units with a unit size A as illustrated on the lower part of (a) the lensless camera in FIG. 1. The unit size A is a size at least larger than the pixel size. In addition, a gap of a minute distance d is provided between the image sensor 11 and the mask 51. In the example illustrated in the diagram, the pitch between the pixels on the image sensor 11 is w.

According to the configuration, the beams L1 to L3 are modulated and enter the image sensor 11 based on the unit size A and the size of the distance d.

Figure 2:
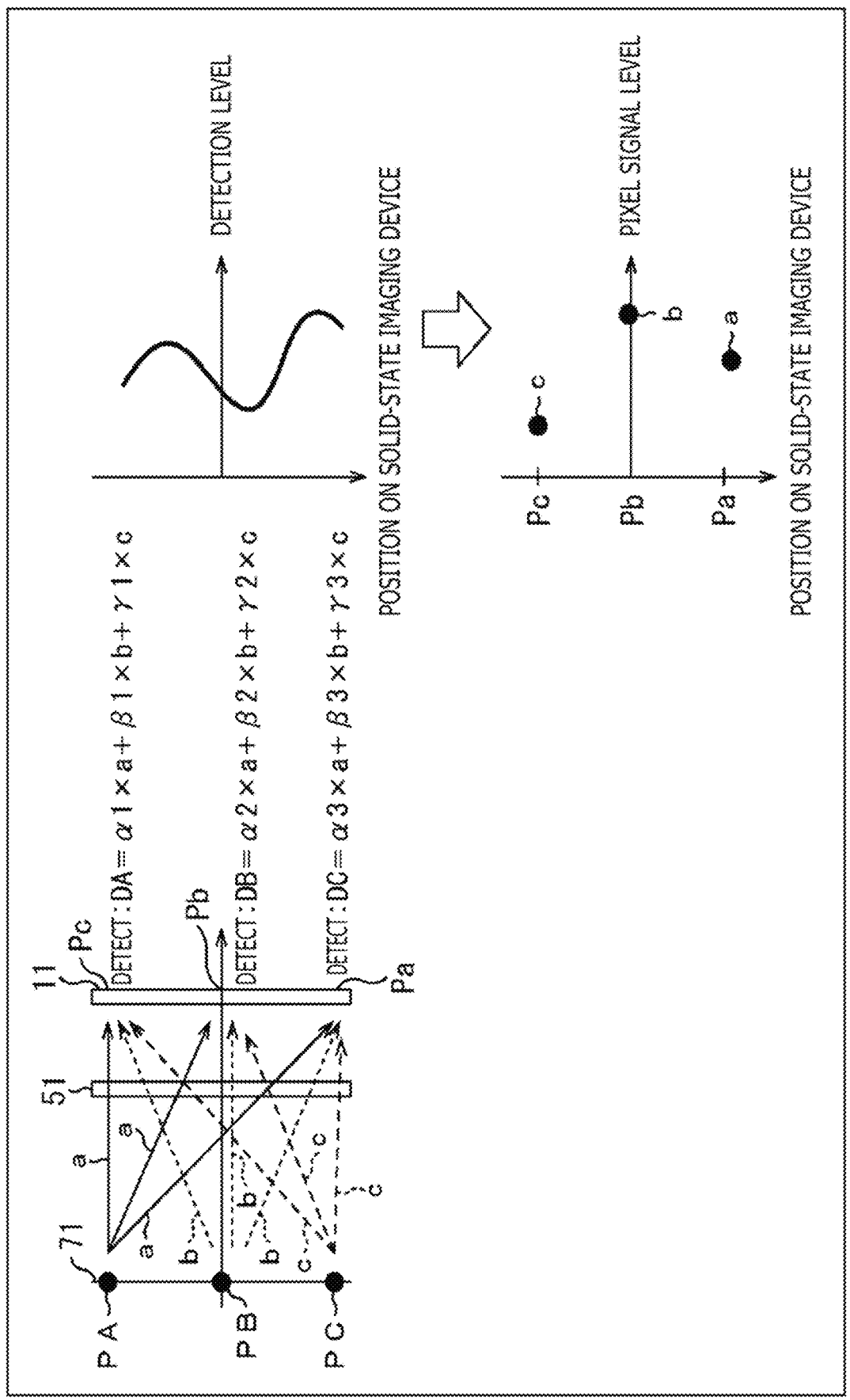
FIG. 2 is a diagram describing the imaging principles of the lensless camera.

More specifically, it is assumed that the light sources of the beams L1 to L3 in the upper diagram of (a) the lensless camera of FIG. 1 are point light sources PA, PB, and PC as illustrated for example on the upper left of FIG. 2, and beams with light intensities a, b, and c transmit through the mask 51 and enter the image sensor 11 at positions Pa, Pb, and Pc, respectively.

In the case of the lensless camera, the incident light is modulated by the openings 51a randomly set on the mask 51, and the detection sensitivity of each pixel has directivity according to the incident angle as illustrated on the upper left of FIG. 2. Here, providing the detection sensitivity of each pixel with the directivity according to the incident angle denotes that the light sensitivity characteristics corresponding to the incident angle of the incident light vary according to the region on the image sensor 11.

That is, assuming that the light sources included in an object surface 71 are point light sources, beams at the same light intensity emitted by the same point light source enter the image sensor 11. However, the beams are modulated by the mask 51, and the incident angles vary according to the regions on the imaging surface of the image sensor 11. Furthermore, the variations in the incident angle of the incident light according to the regions on the image sensor 11 due to the mask 51 provide light sensitivity characteristics, that is, directivity according to the incident angle. Therefore, the beams at the same light intensity are detected at different sensitivities according to the regions on the image sensor 11 due to the mask 51 provided on the earlier stage of the imaging surface of the image sensor 11, and detection signals are detected at detection signal levels that vary according to the regions.

More specifically, as illustrated on the upper right of FIG. 2, detection signal levels DA, DB, and DC of the pixels at the positions Pa, Pb, and Pc on the image sensor 11 are represented by the following Expressions (1) to (3), respectively.

$$DA = \alpha1 \times a + \beta1 \times b + \gamma1 \times c \quad (1)$$

$$DB = \alpha2 \times a + \beta2 \times b + \gamma2 \times c \quad (2)$$

$$DC = \alpha3 \times a + \beta3 \times b + \gamma3 \times c \quad (3)$$

Here, α1 is a coefficient for a detection signal level a that is set according to the incident angle of the beam from the point light source PA on the object surface 71 to be restored, at the position Pa on the image sensor 11. In addition, β1 is a coefficient for a detection signal level b that is set according to the incident angle of the beam from the point light source PB on the object surface 71 to be restored, at the position Pa on the image sensor 11. Furthermore, γ1 is a coefficient for a detection signal level c that is set according to the incident angle of the beam from the point light source PC on the object surface 71 to be restored, at the position Pa on the image sensor 11.

Therefore, (α1×a) of the detection signal level DA is a value indicating the detection signal level based on the beam from the point light source PA at the position Pc. In addition, (β1×b) of the detection signal level DA is a value indicating the detection signal level based on the beam from the point light source PB at the position Pc. Furthermore, (γ1×c) of the detection signal level DA is a value indicating the detection signal level based on the beam from the point light source PC at the position Pc.

Therefore, the detection signal level DA is expressed as a combined value of values obtained by multiplying the components of the point light sources PA, PB, and PC at the position Pa by the coefficients α1, β1, and γ1, respectively. Hereinafter, the coefficients α1, β1, and γ1 will be collectively referred to as a set of coefficients.

Similarly, a set of coefficients α2, β2, and γ2 regarding the detection signal level DB in the point light source PB correspond to the set of coefficients α1, β1, and γ1 regarding the detection signal level DA in the point light source PA, respectively. In addition, a set of coefficients α3, β3, and γ3 regarding the detection signal level DC in the point light source PC correspond to the set of coefficients α1, β1, and γ1 regarding the detection signal level DA in the point light source PA, respectively.

However, the detection signal levels of the pixels at the positions Pa, Pb, and Pc are values expressed by the sums of products of the light intensities a, b, and c of the beams emitted by the point light sources PA, PB, and PC, respectively, and the coefficients. Therefore, the light intensities a, b, and c of the beams emitted from the point light sources PA, PB, and PC, respectively, are mixed in the detection signal levels, and this is different from the image obtained by forming the image of the object.

That is, the set of coefficients α1, β1, and γ1, the set of coefficients α2, β2, and γ2, the set of coefficients α3, β3, and γ3, and the detection signal levels DA, DB, and DC are used to form simultaneous equations, and the light intensities a, b, and c are solved to obtain the pixel values at the positions Pa, Pb, and Pc as illustrated on the lower right of FIG. 1. As a result, a restored image (final image) that is a set of pixel values is reconstructed and restored.

In addition, in a case where the distance between the image sensor 11 illustrated on the upper left of FIG. 2 and the object surface 71 changes, the set of coefficients α1, β1, and γ1, the set of coefficients α2, β2, and γ2, and the set of coefficients α3, β3, and γ3 change. Changing the sets of coefficients can reconstruct the restored images (final images) of the object surface at various distances.

Therefore, the sets of coefficients can be changed to correspond to various distances in one imaging, and this can reconstruct the images of the object surface at various distances from the imaging position.

As a result, in the imaging using the lensless camera, there is no need to be conscious of the phenomenon such as so-called out-of-focus in which the image is captured while the focal point is deviated in the imaging of the imaging apparatus using the lens. As long as the imaging is captured such that the object to be imaged is included in the field of view, the sets of coefficients can be changed according to the distance to reconstruct the images of the object surface at various distances after the imaging.

Note that the detection signal levels illustrated on the upper right of FIG. 2 are not detection signal levels corresponding to the image obtained by forming the image of the object, and the detection signal levels are not pixel values. In addition, the detection signal levels illustrated on the lower right of FIG. 2 are signal values of the pixels corresponding to the image obtained by forming the image of the object, that is, values of the pixels of the restored image (final image), and the detection signal levels are pixel values.

The configuration can realize a so-called lensless camera that does not require an imaging lens or a pinhole. As a result, the imaging lens, the pinhole, and the like are not required components, and the height of the imaging apparatus, that is, the thickness in the incident direction of light in the configuration for realizing the imaging function, can be reduced. In addition, the sets of coefficients can be changed in various ways, and the restored images (final images) on the object surface at various distances can be reconstructed and restored.

Note that hereinafter, the image before reconstruction captured by the image sensor will be simply referred to as an observed image, and the image reconstructed and restored by applying signal processing to the observed image will be referred to as a restored image (final image). Therefore, from one observed image, the sets of coefficients described above can be changed in various ways to reconstruct, as final images, the images on the object surface 71 at various distances.

Figure 3:
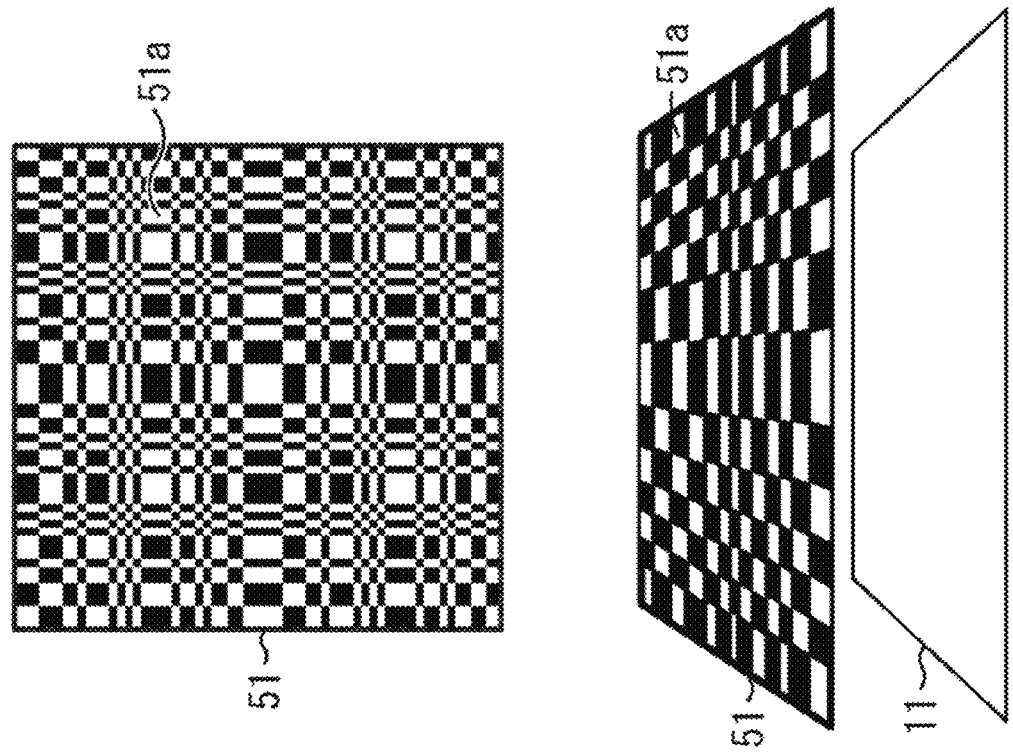
FIG. 3 is a diagram describing an example of a mask of the lensless camera.

FIG. 3 is a diagram illustrating a configuration example of the imaging device in the lensless camera. The upper part is a top view of the mask 51, and the lower part is a perspective view of the mask 51 and the image sensor (solid-state imaging device) 11 as viewed from the side and above.

In the imaging device of a general lensless camera, the unit size of the openings 51a in the mask 51 is uniformly set across the entire region as illustrated for example in FIG. 3, and the image sensor 11 uses the light transmitted through the mask 51 to capture one image as a whole.

[2. Setting of Field of View in Lensless Camera]

Figure 4:
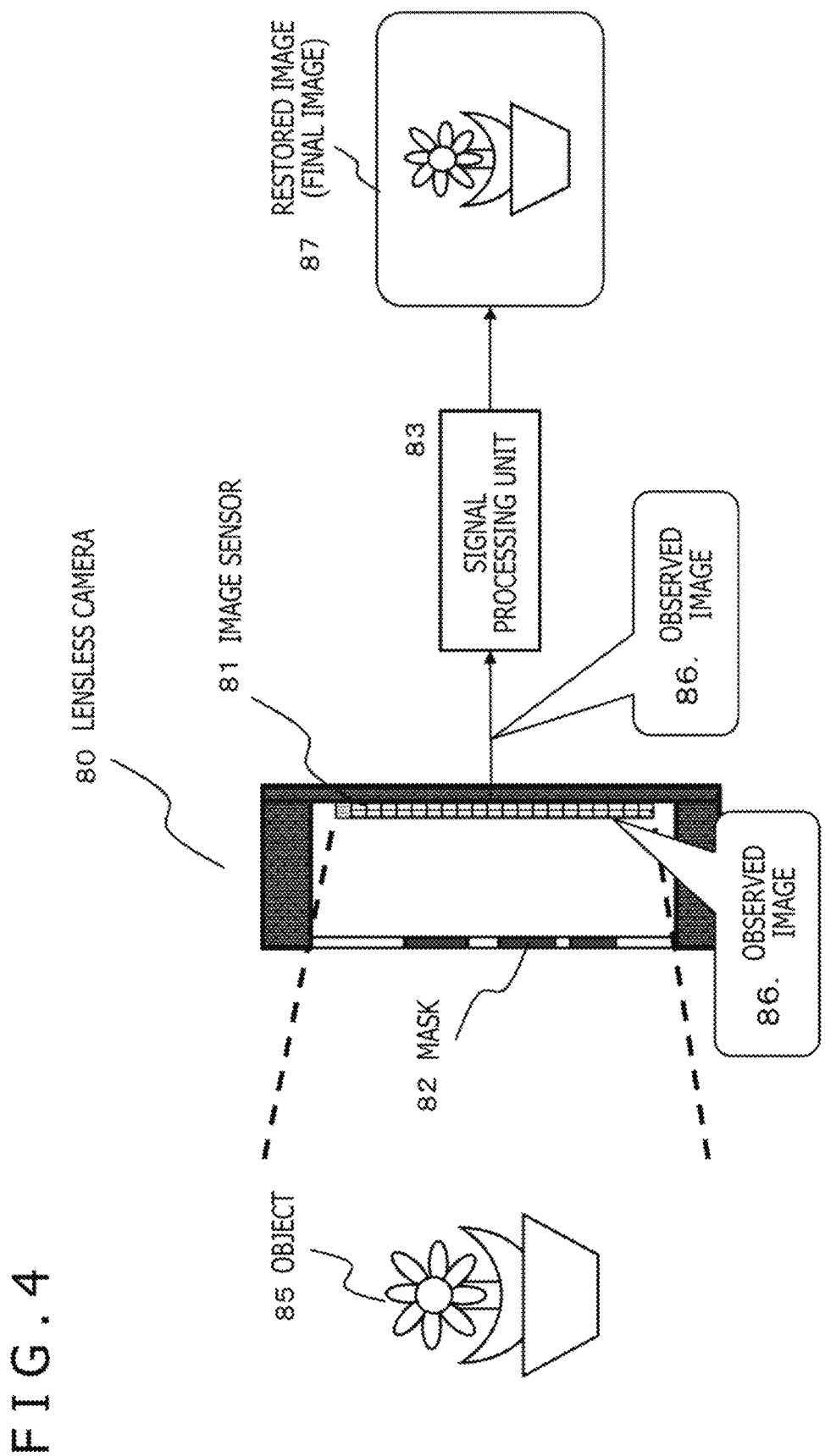
FIG. 4 is a diagram describing an example of an imaging process of the lensless camera.

Next, setting of the field of view in the lensless camera will be described. FIG. 4 is a diagram illustrating a schematic configuration of a lensless camera 80. As illustrated in FIG. 4, the lensless camera 80 includes a mask 82 arranged in front of an image sensor 81. The mask 82 is a mask in which transmission regions and non-transmission regions of light are set as a two-dimensional pattern. The light transmitted through the mask 82 is input to the image sensor.

FIG. 4 illustrates a configuration example in which an object 85 is imaged, and a restored image (final image) 87 including a restored object image is output. Note that an image before reconstruction captured by the image sensor (solid-state imaging device) 81 is an observed image 86, and an image reconstructed and restored by signal processing of the observed image 86 executed by a signal processing unit 83 is the restored image (final image) 87. The restored image (final image) 87 is an image including the object of the captured scene as in the normal camera provided with lens.

The image sensor 81 captures the image (observed image) 86 through the mask 82. The captured data transmitted through the mask 82, that is, the observed image 86 on the image sensor 1, is input to the signal processing unit 83. The signal processing unit 83 applies predetermined signal processing to the observed image 86 on the image sensor 81 to generate the restored image (final image) 87 as a two-dimensional image corresponding to the captured scene as in the general camera.

The light emitted from P three-dimensional sampling points of the region to be imaged can be written as a scene emitted light vector x of a length P, and observed values of the image sensor 81 corresponding to the number of pixels N that receive the light can be expressed as a scene observed value vector y of the length N. The relationship can be represented by using the following relational expression.

$$y = Mx$$

Here, M is a matrix representing a transmission function of the mask 82.

To reproduce the captured image of the object (=emitted light of scene), x satisfying the relationship of the expression can be obtained from the sensor observed values y. The signal processing unit 83 executes a process of multiplying the sensor observed values y input from the image sensor 81 by a matrix including an inverse matrix of the matrix representing the transmission function of the mask 82 to calculate the scene emitted light vector x to calculate the pixel values of the restored image (final image) 87 including the object 85.

Note that a plurality of sets of sensor observed values projected to the image sensor 81 through the mask 82 is obtained in advance in a simulation or the like, and a mask matrix expressing the characteristics (transmission function) of the mask 82 is calculated in advance from the sets. The signal processing unit 83 applies an inverse matrix of the matrix and restores the luminance value of each sampling point of the region to be imaged to generate the restored image (final image) 87 based on the sensor observed values y input from the image sensor 81.

To reproduce the emitted light of the scene, x satisfying the expression, that is, the relationship $$y = Mx$$

can be obtained from the sensor observed values y. The vector x includes an emitted light vector of each sampling point. That is, the vector x indicates the emitted light on the basis of points included in the captured scene, and values obtained by developing the emitted light vector of each sampling point on a two-dimensional plane correspond to configuration pixel values of the restored image (final image) 87.

The resolution of the scene reproduced as the restored image (final image) 87 can be improved by increasing the number P of three-dimensional sampling points included in the scene. However, the increase in the number of sampling points P increases the time for estimating the scene emitted light vector x, and the reconstruction of the image, that is, generation process of the restored image (final image) 87, takes a long time.

The expression y=Mx indicates that all of the light entering the sensor is superimposed on the sensor, and the field of view (FOV) of the image to be restored is significantly wide.

The field of view (FOV) of the lensless camera is wide, and the number of sampling points for expressing the entire scene is large. However, in a case where the lensless camera is used as a camera, it is often desirable to narrow down the FOV in some degree to limit the imaging range.

A specific example will be described with reference to FIGS. 5A and 5B. FIGS. 5A and 5B illustrate two image capturing examples of the lensless camera (lensless imaging apparatus) 80.

FIG. 5A Example of captured image with wide field of view

FIG. 5B Example of captured image with narrow field of view

The user (photographer) may want to capture an image by limiting the imaging range to only a specific object, such as a region of a person, as illustrated in FIG. 5B. In this way, the user may want to adjust the field of view (FOV) of the lensless camera 80 to capture images of various regions.

For a process of executing this, it is possible to cut out only part of the captured image. However, there is a problem that the resolution is reduced in that case.

Furthermore, as described above, there is also a method of increasing the resolution by increasing the number of three-dimensional sampling points P that can be reproduced in the captured image. However, there is a problem that the reconstruction time of image increases, and this is not practical.

Another example of the method for the field of view (FOV) includes a method of changing the distance between the image sensor 81 and the mask 82 to restrict the light entering the image sensor 81 in terms of hardware as illustrated in FIGS. 6A and 6B.

FIG. 6A is an example of reducing the distance (L1) between the image sensor 81 and the mask 82 to set a large field of view. On the other hand, FIG. 6B is an example of increasing the distance (L2) between the image sensor 81 and the mask 82 to set a small field of view.

As compared to the setting of FIG. 6A in which the distance (L1) between the image sensor 81 and the mask 82 is reduced, the angle of light entering the image sensor 81 is narrower in the setting of FIG. 6B in which the distance (L2) between the image sensor 81 and the mask 82 is increased, and the field of view of the captured image is smaller. That is, an image of a narrow region can be captured. The control illustrated in FIGS. 6A and 6B generates the same effect as a zoom camera.

In the example illustrated in FIGS. 6A and 6B, the positions of the sampling points can be limited and restricted in terms of hardware to narrow down the field of view (FOV) while maintaining the resolution. However, although a predetermined field of view can be set in the method, hardware for moving the mask is necessary to realize the zoom lens. Therefore, there is a problem that the height of the camera module is increased by an amount equivalent to the position of the mask.

Note that a plurality of LCDs can be arranged in front of the sensor to control transmission/non-transmission of light from an arbitrary direction. Controlling the plurality of layers of LCDs also allows to perform the pan-tilt or to project only a plurality of ROIs on the screen. PTL 1 illustrates a method of arranging a MEMS array filter in front of the sensor and switching the transmission/non-transmission of light to thereby change the FOV. However, all of these methods require additional hardware, and an increase in the size and the cost is inevitable. In addition, although an optical filter is used as a mask, measures are not taken except for the transmission wavelength region. For example, an appropriate filter corresponding to the far-infrared region is not mentioned.

[3. Configuration and Process of Image Processing Apparatus of Present Disclosure]

Next, a configuration and a process of an image processing apparatus of the present disclosure will be described with reference to FIG. 7 and subsequent drawings.

Figure 7:
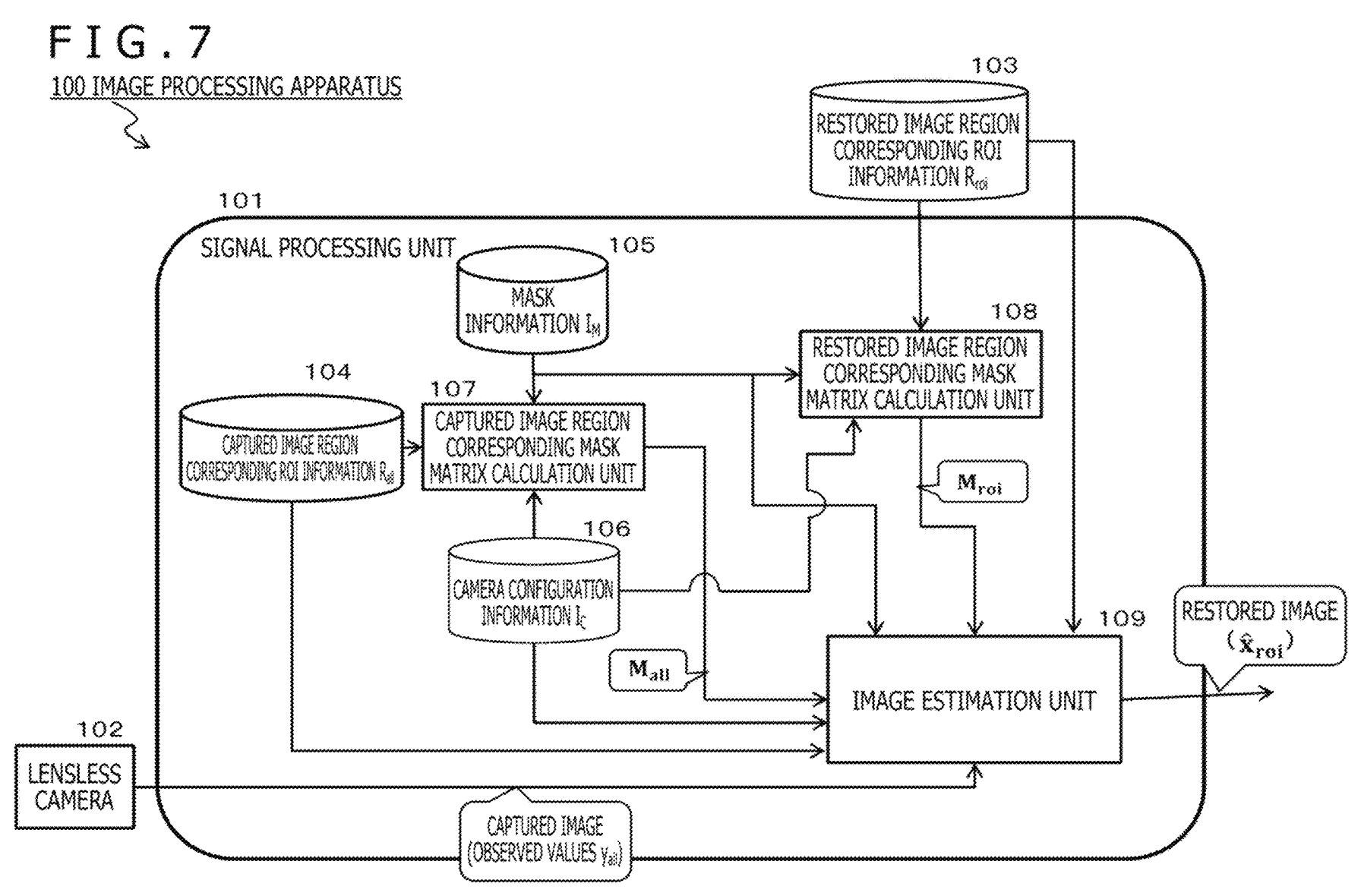

FIG. 7 is a diagram illustrating a configuration example of an image processing apparatus 100 according to the present disclosure. The image processing apparatus 100 includes a signal processing unit 101 that receives a captured image of a lensless camera (lensless imaging apparatus) 102 to generate and output a restored image set to a predetermined field of view (FOV).

For example, the signal processing unit 101 receives observed image signals as output of an image sensor of the lensless camera 102 and generates a restored image of a restored image region including part of a captured image region of the lensless camera 101.

The lensless camera 102 is a camera including the image sensor 81 and the mask 82 described with reference to FIGS. 4, 6A and 6B. Note that instead of the configuration that allows to control the distance between the image sensor 81 and the mask 82 as described with reference to FIGS. 6A and 6B, the distance between the image sensor 81 and the mask 82 is fixed.

The signal processing unit 101 receives a captured image (observed values $y_{all}$) as output of the lensless camera 102. The captured image (observed value $y_{all}$) includes pixel values on the image sensor according to the amount of light received through the mask of the lensless camera 102.

The signal processing unit 101 applies signal processing to the input image (captured image (observed values $y_{all}$)) and outputs a restored image ($\hat{x}_{roi}$) set to a predetermined field of view (FOV). Note that ($\hat{x}$) denotes a character provided with ($\hat{}$) above x. The same applies to the following description. This is the same for other characters, and for example, ($\hat{y}$) denotes a character provided with ($\hat{}$) above y.

The user can freely set the field of view (FOV). A captured image (observed values $y_{all}$) 110 as output of the lensless camera 102 is a captured image with one fixed field of view unrelated to the field of view set by the user.

The signal processing unit 101 receives information including (input 1) the captured image (observed values $y_{all}$) 110 as output of the lensless camera 102 and (input 2) "restored image region corresponding ROI (Region of Interest) information" $R_{roi}$ equivalent to field-of-view setting information of the restored image ($\hat{x}_{roi}$) to be output and generates and outputs output information including (output 1) the restored image ($\hat{x}_{roi}$) set to the predetermined field of view (FOV).

Of the restored image ($\hat{x}_{roi}$) as output data, ($\hat{x}_{roi}$) is equivalent to the emitted light of each sampling point x included in a captured scene (ROI) in the predetermined field of view. That is, the restored image ($\hat{x}_{roi}$) is an image obtained by reproducing the object image of the captured scene and is an image similar to the image captured by a normal camera with lens.

The signal processing unit 101 holds captured image region corresponding ROI information ($R_{all}$) 104, mask information ($I_M$) 105, and camera configuration information ($I_C$) 106 in a storage unit. Note that although the storage unit storing the information is illustrated inside of the signal processing unit 101 in FIG. 7, the storage unit may be set outside of the signal processing unit 101.

The signal processing unit 101 further includes data processing units including a captured image region corresponding mask matrix ($M_{all}$) calculation unit 107, a restored image region corresponding mast matrix ($M_{roi}$) calculation unit 108, and an image estimation unit 109.

The captured image region corresponding mask matrix ($M_{all}$) calculation unit 107 calculates a mask matrix ($M_{all}$) corresponding to the entire captured image (all ROI) captured by the image sensor of the lens camera 102. The mask matrix ($M_{all}$) is a matrix representing the transmission function of the mask described above.

That is, the matrix represents the transmission function of a mask satisfying the relational expression $$y = Mx$$

where the light emitted from the P three-dimensional sampling points of the region to be imaged is written as the scene emitted light vector x of the length P, and the observed values of the image sensor corresponding to the number of pixels N that receive the light are expressed as the scene observed value vector y of the length N.

On the other hand, the restored image region corresponding mast matrix ($M_{roi}$) calculation unit 108 calculates a mask matrix ($M_{roi}$) corresponding to the restored image ($\hat{x}_{roi}$) as output data, instead of the entire captured image (all ROI) captured by the image sensor of the lens camera 102. That is, the restored image region corresponding mast matrix ($M_{roi}$) calculation unit 108 calculates a restored image region corresponding mask matrix applied to generate the restored image of the restored image region as part of the captured image region of the lensless camera 102.

Figure 8:
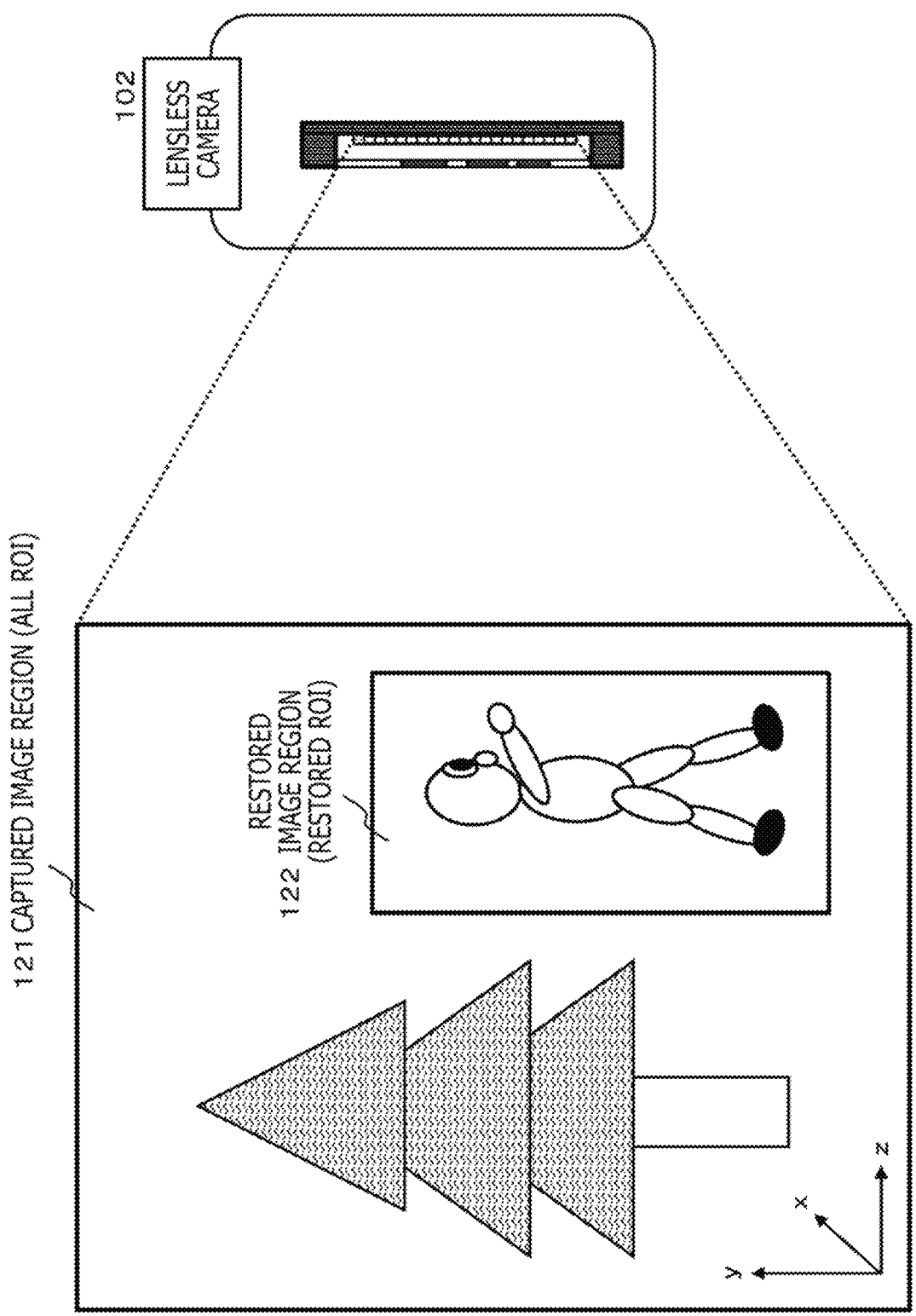
FIG. 8 is a diagram describing an example of the signal processing applied to the captured image of the lensless camera.

For example, as illustrated in FIG. 8, the lensless camera 102 captures an image of a captured image region (all ROI) 121 with a fixed field of view. Here, the image output by the signal processing unit 101 is an image of a limited region indicated by a restored image region (restored ROI) 122. Note that each region illustrated in FIG. 8 is a three-dimensional region.

The three-dimensional region is equivalent to the setting region of the sampling points where the scene emitted light vector x of the relational expression $$y = Mx$$

is measured. The captured image region corresponding mask matrix ($M_{all}$) calculation unit 107 calculates the mask matrix ($M_{all}$) representing the transmission function of the mask that can be applied to the relational expression $$y = Mx$$

in a case where, for example, it is assumed that the sampling points are arranged in the captured image region (all ROI) 121 illustrated in FIG. 8. In this way, the captured image region corresponding mask matrix ($M_{all}$) calculation unit 107 calculates the mask matrix ($M_{all}$) corresponding to the captured image region (all ROI) 121.

On the other hand, the restored image region corresponding mast matrix ($M_{roi}$) calculation unit 108 calculates a mask matrix ($M_{roi}$) corresponding to the restored image region (restored ROI) 122. That is, the restored image region corresponding mast matrix ($M_{roi}$) calculation unit 108 calculates the mask matrix ($M_{roi}$) representing the transmission function of the mask that can be applied to the relational expression $$y = Mx$$

in a case where, for example, it is assumed that the sampling points are arranged on the restored image region (restored ROI) 122 illustrated in FIG. 2. That is, the restored image region corresponding mast matrix ($M_{roi}$) calculation unit 108 calculates a restored image region corresponding mask matrix applied to generate the restored image of the restored image region including part of the captured image region of the lensless camera 102.

The captured image region corresponding mask matrix ($M_{all}$) calculation unit 107 receives information including the captured image region corresponding ROI information ($R_{all}$) 104, the mask information ($I_M$) 105, and the camera configuration information ($I_C$) 106 and calculates a mask matrix ($M_{all}$) corresponding to the captured image region (all ROI) 121.

The captured image region corresponding ROI information ($R_{all}$) 104 is, for example, setting range information of the captured image region (all ROI) 121 illustrated in FIG. 8. Furthermore, the number (P) of sampling points in the setting range and the sampling point setting position (x) information are also recorded. The mask information ($I_M$) 105 is, for example, two-dimensional pattern information including the transmission regions and the non-transmission regions of light in the mask.

The camera configuration information ($I_C$) 106 is information regarding the mask and the image sensor and includes, for example, the mask size, the image sensor size, the number of image sensor pixels (N), and the information of distance between the mask and the sensor. Furthermore, the number (P) of sampling points set in the captured image region and the sampling point setting position (x) information are also recorded.

The captured image region corresponding mask matrix ($M_{all}$) calculation unit 107 receives the information and calculates the mask matrix ($M_{all}$) corresponding to the captured image region (all ROI) 121.

On the other hand, the restored image region corresponding mast matrix ($M_{roi}$) calculation unit 108 calculates the mask matrix ($M_{roi}$) corresponding to the restored image region (restored ROI) 122. The restored image region corresponding mast matrix ($M_{roi}$) calculation unit 108 receives information including restored image region corresponding ROI information ($R_{roi}$) 103, the mask information ($I_M$) 105, and the camera configuration information ($I_C$) 106 and calculates the mask matrix ($M_{roi}$) corresponding to the restored image region (restored ROI) 122.

The restored image region corresponding ROI information ($R_{roi}$) 103 is, for example, setting range information of the restored image region (restored ROI) 122 illustrated in FIG. 8. Furthermore, the number (P) of sampling points in the setting range and the sampling point setting position (x) information are also recorded. The restored image region corresponding ROI information ($R_{roi}$) 103 is information regarding the restored image region that can be freely set by the user, and the user can write or update the restored image region corresponding ROI information ($R_{roi}$) 103 through an input unit not illustrated.

The mask information ($I_M$) 105 is, for example, the two-dimensional pattern information including the transmission regions and the non-transmission regions of light in the mask. The camera configuration information ($I_C$) 106 includes the distance between the mask and the image sensor, the number of pixels (N) information of the image sensor, and the like. The restored image region corresponding mast matrix ($M_{roi}$) calculation unit 108 receives the information and calculates the mask matrix ($M_{all}$) corresponding to the restored image region (restored ROI) 122.

Note that a detailed sequence of a mask matrix calculation process executed by the mask matrix calculation units including the captured image region corresponding mask matrix ($M_{all}$) calculation unit 107 and the restored image region corresponding mast matrix ($M_{roi}$) calculation unit 108 will be described in detail in a later stage with reference to a flow chart illustrated in FIG. 9.

The image estimation unit 109 receives the following information including (a) the captured image (observed values $y_{all}$) as output of the lensless camera 102, (b) the mask information ($I_N$) 105, (c) the camera configuration information ($I_C$) 106, (d) the captured image region corresponding ROI information ($R_{all}$) 104, (e) the restored image region corresponding ROI information ($R_{roi}$) 103, (f) the captured image region corresponding mask matrix ($M_{all}$) calculated by the captured image region corresponding mask matrix ($M_{all}$) calculation unit 107, and (g) the restored image region corresponding mast matrix ($M_{roi}$) calculated by the restored image region corresponding mast matrix ($M_{roi}$) calculation unit 108.

The image estimation unit 109 receives the information and outputs the restored image ($\hat{x}_{roi}$) set to the predetermined field of view (FOV). Of the restored image ($\hat{x}_{roi}$) as output data, ($\hat{x}_{roi}$) denotes the emitted light of each sampling point x included in the captured scene (ROI) in the predetermined field of view, such as the restored image region (restored ROI) 122 illustrated in FIG. 8.

The image estimation unit 109, for example, subtracts observed image signals outside of the restored image region not included in a restored image region from observed image signals as output of the image sensor of the lensless camera 102 to calculate observed image signals inside of the restored region and executes arithmetic processing of the observed image signals inside of the restored region and a pseudo-inverse matrix or an inverse matrix of a restored image region corresponding mask matrix to generate a restored image of the restored image region including part of a captured image region of the lensless camera. A detailed sequence of the restored image generation process executed by the image estimation unit 109 will be described in detail in a later stage with reference to a flow chart illustrated in FIG. 10.

[4. Detailed Sequence of Mask Matrix Calculation Process in Mask Matrix Calculation Unit]

Next, the detailed sequence of the mask matrix calculation process executed by the mask matrix calculation units including the captured image region corresponding mask matrix ($M_{all}$) calculation unit 107 and the restored image region corresponding mast matrix ($M_{roi}$) calculation unit 108 will be described with reference to a flow chart illustrated in FIG. 9.

Note that as described above, the captured image region corresponding mask matrix ($M_{all}$) calculation unit 107 calculates the mask matrix ($M_{all}$) corresponding to the captured image region (all ROI) 121 illustrated for example in FIG. 8. The restored image region corresponding mast matrix ($M_{roi}$) calculation unit 108 calculates the mask matrix ($M_{all}$) corresponding to the restored image region (restored ROI) 122 illustrated for example in FIG. 8. Only the corresponding regions are different, and the basic processing sequence is the same. Only the information to be acquired is different in an acquisition process of ROI information in step S103 illustrated in FIG. 9. The details will be described in each of the steps described below. Hereinafter, processes of the steps of the flow chart illustrated in FIG. 9 will be sequentially described.

(Step S101)

The captured image region corresponding mask matrix ($M_{all}$) calculation unit 107 and the restored image region corresponding mast matrix ($M_{roi}$) calculation unit 108 of the signal processing unit 101 first acquire the mask information $I_M$ in step S101. Note that the two mask matrix calculation units including the captured image region corresponding mask matrix ($M_{all}$) calculation unit 107 and the restored image region corresponding mast matrix ($M_{roi}$) calculation unit 108 will be simply referred to as a mask matrix calculation unit in the description.

The mask information $I_M$ acquired in step S101 is, for example, the two-dimensional pattern information including the transmission regions and the non-transmission regions of light in the mask as described above.

(Step S102)

Next, the mask matrix calculation unit acquires the camera configuration information $I_C$ in step S102. The camera configuration information $I_C$ is information regarding the mask and the image sensor and includes, for example, the mask size, the image sensor size, the number of image sensor pixels (N), the information of distance between the mask and the sensor, and the like.

(Step S103)

Next, the mask matrix calculation unit acquires the ROI information in step S103. In the process of step S103, different processes are executed in the two mask matrix calculation units including the captured image region corresponding mask matrix ($M_{all}$) calculation unit 107 and the restored image region corresponding mast matrix ($M_{roi}$) calculation unit 108.

The captured image region corresponding mask matrix ($M_{all}$) calculation unit 107 acquires the captured image region corresponding ROI information ($R_{all}$) 104 illustrated in FIG. 7. The image region corresponding ROI information ($R_{all}$) 104 includes, for example, the setting range information of the captured image region (all ROI) 121 illustrated in FIG. 8, the number (P) of sampling points, the setting position (x) information, and the like. That is, the captured image region corresponding mask matrix ($M_{all}$) calculation unit 107 acquires the captured image region corresponding ROI information ($R_{all}$) 104 that is the ROI information in the case where it is assumed that the image sensor of the lensless camera 102 has imaged the emitted light of the sampling points in the captured image region (all ROI) 121.

On the other hand, the restored image region corresponding mast matrix ($M_{roi}$) calculation unit 108 acquires the restored image region corresponding ROI information ($R_{roi}$) 103 illustrated in FIG. 7. The restored image region corresponding ROI information ($R_{roi}$) 103 includes, for example, the setting range information of the restored image region (restored ROI) 122 illustrated in FIG. 8, the number (P) of sampling points, the setting position (x) information, and the like. That is, the restored image region corresponding mast matrix ($M_{roi}$) calculation unit 108 acquires the restored image region corresponding ROI information ($R_{roi}$) 103 that is the ROI information in the case where it is assumed that the image sensor of the lensless camera 102 has imaged the emitted light of the sampling points in the restored image region (restored ROI) 122 illustrated in FIG. 8.

Note that the number (P) of sampling points and the setting position (x) information can also be acquired from the camera configuration information $I_C$ 106.

(Step S104)

Next, the mask matrix calculation unit uses the number of sensor pixels N, the positions x of the sampling points, and the number of sampling points P to prepare and initialize a P×N matrix M in step S104. That is, the mask matrix calculation unit generates a matrix including P×N elements (matrix elements) defined by the number of sensor pixels (N) and the number of sampling points (P).

Note that the initial value of each element is, for example, 0.

Note that here, the matrices generated by the captured image region corresponding mask matrix ($M_{all}$) calculation unit 107 and the restored image region corresponding mast matrix ($M_{roi}$) calculation unit 108 are different matrices.

The captured image region corresponding mask matrix ($M_{all}$) calculation unit 107 assumes that the sampling points are set in the captured image region (all ROI) 121 illustrated in FIG. 8 to calculate the mask matrix ($M_{all}$) corresponding to the captured image region (all ROI) 121 illustrated for example in FIG. 8, and the captured image region corresponding mask matrix ($M_{all}$) calculation unit 107 generates a matrix including P×N elements (matrix elements), where P is the number of sampling points, and N is the number of sensor pixels.

On the other hand, the restored image region corresponding mast matrix ($M_{roi}$) calculation unit 108 assumes that the sampling points are set in the restored image region (restored ROI) 122 illustrated in FIG. 8 to calculate the mask matrix ($M_{roi}$) corresponding to the restored image region (restored ROI) 122 illustrated for example in FIG. 8, and the restored image region corresponding mast matrix ($M_{roi}$) calculation unit 108 generates a matrix including P×N elements (matrix elements), where P is the number of sampling points, and N is the number of sensor pixels.

Note that in the matrices including P×N elements generated by the captured image region corresponding mask matrix ($M_{all}$) calculation unit 107 and the restored image region corresponding mast matrix ($M_{roi}$) calculation unit 108, the number of sensor pixels N is the number of pixels (N) of the image sensor of the lensless camera 102 and is the same.

On the other hand, the number of sampling points P can be freely set. For example, the numbers of sampling points P of the matrices including P×N elements generated by the captured image region corresponding mask matrix ($M_{all}$) calculation unit 107 and the restored image region corresponding mast matrix ($M_{roi}$) calculation unit 108 may be set in proportion to, for example, the sizes of the captured image region (all ROI) 121 and the restored image region (restored ROI) 122 illustrated in FIG. 8, or the numbers of sampling points P may be the same.

In the case where the same number of sampling points P is set, the restored image of the restored image region (restored ROI) 122 can be an image with higher resolution than the case in which the number of sampling points P is set in proportion to the size of the region. As described above, the resolution of the restored image can be improved by increasing the number of sampling points P. That is, a large number of dense sampling points can be set in the restored image region (restored ROI) 122 illustrated in FIG. 8 to improve the resolution of the restored image.

(Steps S105 and S106)

The process from step S105 is a setting process of a value of each element of the matrix generated in step S104.

First, an element of the matrix (matrix element) as a target of setting the value is selected in steps S105 and S106. First, an element (p=0, n=0) on the upper left corner of the P×N matrix is selected in steps S105 and S106. Note that p and n are element identification indices of the P×N matrix.

(Step S107)

Next, in step S107, the mask matrix calculation unit obtains a sensor pixel value (y) of an nth pixel at the time that the light of a pth sampling point x(p) is projected to the sensor through the mask. The pixel value calculation process can be executed in a simulation process or an actual measurement process.

(Step S108)

Next, in step S108, the mask matrix calculation unit applies the sensor pixel value (y) calculated in the process of step S107, that is, the value of the sensor pixel value (y) of the nth pixel at the time that the light of the pth sampling point x(p) is projected to the sensor through the mask, to set $$y/x(p)$$

as a value of the selected element (p=0, n=0) of the P×N mask matrix.

The setting value is a setting value according to the relational expression described above, that is, the relational expression $$y=Mx$$

of the case in which the light emitted from the P three-dimensional sampling points of the region to be imaged is written as the scene emitted light vector x of the length P, and the observed values of the image sensor corresponding to the number of pixels N that receive the light are set as the scene observed value vector y of the length N.

(Steps S109 to S112)

Steps S109 to S114 are an update process of the element of the matrix (matrix element) as a target of setting the value and a processing end determination process. In step S109, the matrix element index n is incremented by 1.

In step S110, whether $$n<N$$

is determined,
and if $$n<N,$$

the process of steps S107 and S108 is applied to a new matrix element (p, n) to determine the value of the new matrix element (p, n).

Furthermore, the matrix element index p is incremented by 1 in step S111.

In step S112, whether $$p<P$$

is determined,
and if $$p<P,$$

the process of steps S107 and S108 is applied to a new matrix element (p, n) to determine the value of the new matrix element (p, n).

Eventually, in step S112, if it is determined that the expression $$p<P$$

is not satisfied, the values of all of the elements of the P×N matrix are determined, and the matrix is completed.

The mask matrix generated in the flow is a mask matrix according to the relational expression described above, that is, the relational expression $$y=Mx$$

of the case in which the light emitted from the P three-dimensional sampling points of the region to be imaged is written as the scene emitted light vector x of the length P, and the observed values of the image sensor corresponding to the number of pixels N that receive the light are set as the scene observed value vector y of the length N.

Note that the mask matrix generated by the captured image region corresponding mask matrix ($M_{all}$) calculation unit 107 according to the flow is the captured image region corresponding mask matrix ($M_{all}$) and is the captured image region corresponding mask matrix ($M_{all}$) satisfying the relational expression $$y=Mx$$

regarding the sensor pixel values (y) of the case where it is assumed that the image sensor of the lensless camera 102 has received the emitted light of the P sampling points set in the captured image region (all ROI) 121 illustrated for example in FIG. 8.

On the other hand, the mask matrix generated according to the flow by the restored image region corresponding mast matrix ($M_{roi}$) calculation unit 108 is the restored image region corresponding mast matrix ($M_{roi}$) and is the restored image region corresponding mast matrix ($M_{roi}$) satisfying the relational expression $$y=Mx$$

regarding the sensor pixel values (y) of the case where it is assumed that the image sensor of the lensless camera 102 has received the emitted light of the P sampling points set in the restored image region (restored ROI) 122 illustrated for example in FIG. 8.

[5. Detailed Sequence of Image Estimation Process in Image Estimation Unit]

Figure 10:
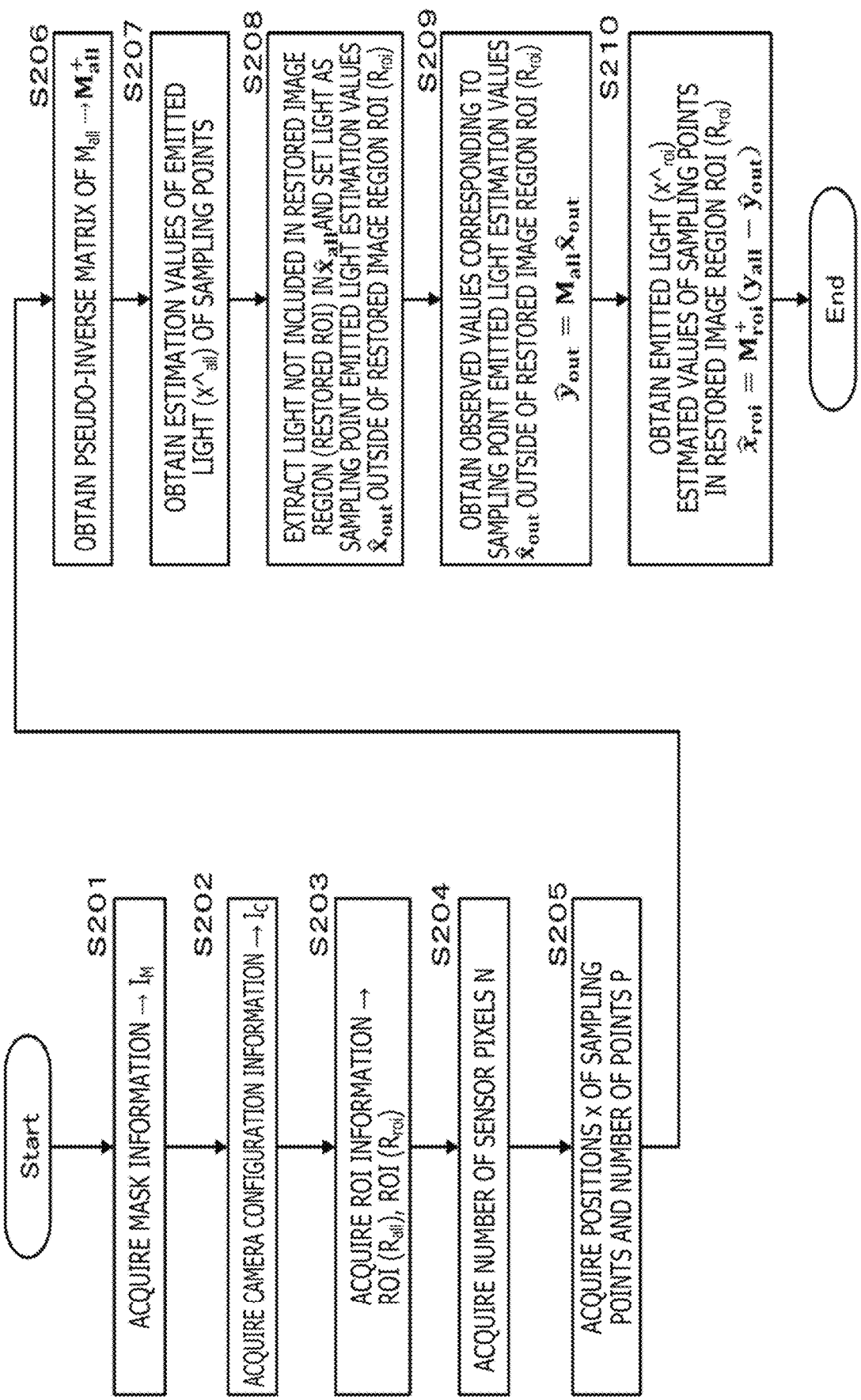
FIG. 10 is a diagram illustrating a flow chart describing a processing sequence executed by an image estimation unit of the signal processing unit.

Next, with reference to the flow chart illustrated in FIG. 10, the detailed sequence of the image estimation process in the image estimation unit 109 will be described.

As described above with reference to FIG. 7, the image estimation unit 109 receives the information including (a) the captured image (observed values $y_{all}$) as output of the lensless camera 102, (b) the mask information ($I_N$) 105, (c) the camera configuration information ($I_C$) 106, (d) the captured image region corresponding ROI information ($R_{all}$) 104, (e) the restored image region corresponding ROI information ($R_{roi}$) 103, (f) the captured image region corresponding mask matrix ($M_{all}$) calculated by the captured image region corresponding mask matrix ($M_{all}$) calculation unit 107, and (g) the restored image region corresponding mast matrix ($M_{roi}$) calculated by the restored image region corresponding mast matrix ($M_{roi}$) calculation unit 108 and outputs the restored image ($\hat{x}_{roi}$) set to the predetermined field of view (FOV). Of the restored image ($\hat{x}_{roi}$) as output data, ($\hat{x}_{roi}$) denotes the emitted light of each sampling point x included in the captured scene (ROI) in the predetermined field of view, such as the restored image region (restored ROI) 122 illustrated for example in FIG. 8.

As described above, the image estimation unit 109 executes, for example, the arithmetic processing of the observed image signals inside of the restored region and the pseudo-inverse matrix or the inverse matrix of the restored image region corresponding mask matrix to generate the restored image of the restored image region including part of the captured image region of the lensless camera.

Hereinafter, the processes of the steps of the flow chart illustrated in FIG. 10 will be sequentially described.

(Step S201)

The image estimation unit 109 of the signal processing unit 101 first acquires the mask information $I_M$ in step S201. The mask information $I_M$ acquired in step S201 is, for example, the two-dimensional pattern information including the transmission regions and the non-transmission regions of light of the mask as described above.

(Step S202)

Next, the image estimation unit 109 acquires the camera configuration information $I_C$ in step S202. The camera configuration information $I_C$ is information regarding the mask and the image sensor and includes, for example, the mask size, the image sensor size, the number of image sensor pixels (N), the information of distance between the mask and the sensor, and the like.

(Step S203)

Next, the image estimation unit 109 acquires the ROI information in step S203. In step S203, the image estimation unit 109 acquires the captured image region corresponding ROI information ($R_{all}$) 104 and the restored image region corresponding ROI information ($R_{roi}$) 103 illustrated in FIG. 7. The image region corresponding ROI information ($R_{all}$) 104 is, for example, the setting position (x) information of the sampling points in the captured image region (all ROI) 121 illustrated in FIG. 8.

That is, the image region corresponding ROI information ($R_{all}$) 104 is the ROI information of the case where it is assumed that the image sensor of the lensless camera 102 has imaged the emitted light of the sampling points in the captured image region (all ROI) 121 illustrated in FIG. 8. The ROI information is information indicating the range of the region to be reproduced in the three-dimensional region to be reproduced.

On the other hand, the restored image region corresponding ROI information ($R_{roi}$) 103 is, for example, the setting position (x) information of the sampling points in the restored image region (restored ROI) 122 illustrated in FIG. 8. That is, the restored image region corresponding ROI information ($R_{roi}$) 103 is the ROI information of the case where it is assumed that the image sensor of the lensless camera 102 has imaged the emitted light of the sampling points in the restored image region (restored ROI) 122 illustrated in FIG. 8.

In this way, in step S203, the image estimation unit 109 acquires the captured image region corresponding ROI information ($R_{all}$) 104 and the restored image region corresponding ROI information ($R_{roi}$) 103 illustrated in FIG. 7.

(Step S204)

Next, the image estimation unit 109 acquires the number of sensor pixels N in step S204. That is, the image estimation unit 109 acquires the number of sensor pixels (N) of the image sensor of the lensless camera 102. The information is acquired from, for example, the camera configuration information $I_C$ 106 illustrated in FIG. 7.

(Step S205)

Next, the image estimation unit 109 acquires the positions x of the sampling points and the number of points P in step S205.

That is, the number of sampling points (P) and the position (x) of each sampling point are acquired.

Note that the information is acquired from, for example, one of the camera configuration information ($I_C$) 106, the captured image region corresponding ROI information ($R_{all}$) 104, and the restored image region corresponding ROI information ($R_{roi}$) 103.

The number of sampling points (P) in the captured image region and the position (x) of each sampling point are acquired from the captured image region corresponding ROI information ($R_{all}$) 104. Specifically, for example, the number (P) of sampling points and the positions (x) set in the captured image region (all ROI) 121 illustrated in FIG. 8 are acquired. In addition, the number of sampling points (P) in the restored image region and the position (x) of each sampling point are acquired from the restored image region corresponding ROI information ($R_{roi}$) 103. Specifically, for example, the number (P) of sampling points and the positions (x) set in the restored image region (restored ROI) 122 illustrated in FIG. 8 are acquired.

(Steps S206 and S207)

Next, the image estimation unit 109 in step S206 calculates a pseudo-inverse matrix ($M^+_{all}$) of the captured image region corresponding mask matrix ($M_{all}$) calculated by the captured image region corresponding mask matrix ($M_{all}$) calculation unit 107. Furthermore, in step S207, the image estimation unit 109 uses the pseudo-inverse matrix ($M^+_{all}$) obtained in step S206 to calculate emitted light estimation values ($\hat{x}_{all}$) of the sampling points. The emitted light estimation values ($\hat{x}_{all}$) of the sampling points denote emitted light of each sampling point x included in the captured scene, such as the captured image region (all ROI) 121 illustrated for example in FIG. 8.

A specific example of the calculation process of the emitted light estimation values ($\hat{x}_{all}$) of the sampling points will be described with reference to FIG. 11.

Figure 11:
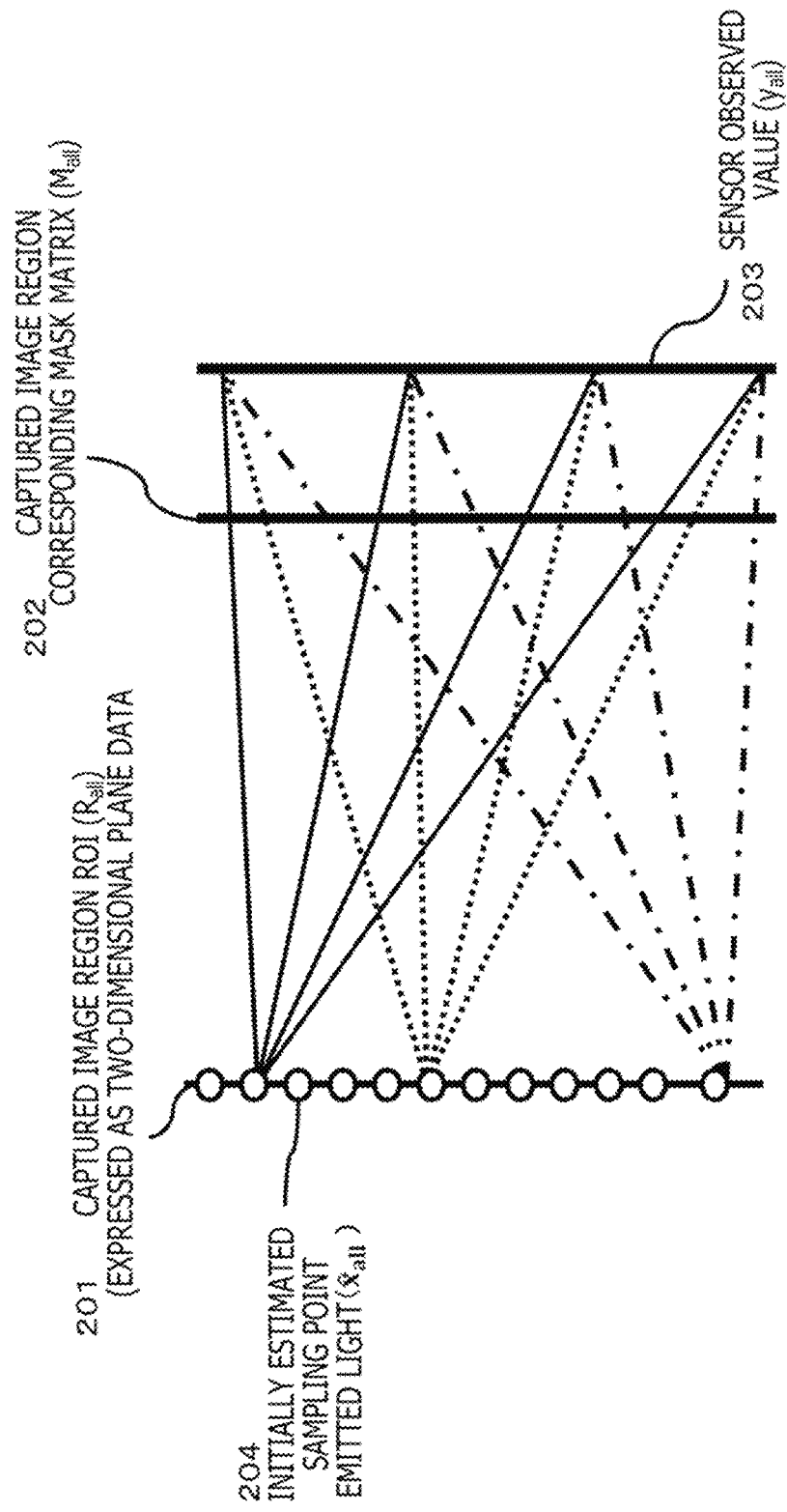
FIG. 11 is a diagram describing an example of a process executed by the image estimation unit.

FIG. 11 illustrates (a) a captured image region ROI ($R_{all}$) 201 expressed as two-dimensional plane data, (b) emitted light ($\hat{x}_{all}$) 204 of sampling points set in the captured image region ROI ($R_{all}$) 201, (c) a mask including a captured image region corresponding mask matrix ($M_{all}$) 202, and (d) sensor observed values (pixel values) ($y_{all}$) 203 of the case in which the image sensor has received the emitted light ($\hat{x}_{all}$) 204 of the sampling points set in the captured image region ROI ($R_{all}$) 201.

That is, illustrated are the sensor observed values (pixel values) ($y_{all}$) 203 of the case in which the image sensor has received the emitted light ($\hat{x}_{all}$) 204 of the sampling points set in the captured image region ROI ($R_{all}$) 201 expressed as two-dimensional plane data, through the mask including the captured image region corresponding mask matrix ($M_{all}$)

202. Note that although the captured image region ROI ($R_{all}$) is basically set as a three-dimensional region as described with reference to FIG. 8, the light in the three-dimensional region passes through the two-dimensional plane parallel to the image sensor and enters the image sensor. Therefore, the captured image region ROI ($R_{all}$) provided as a three-dimensional region can be converted into the captured image region ROI ($R_{all}$) 201 and expressed as two-dimensional plane data as illustrated in FIG. 11. The sampling points that output the emitted light can also be expressed and set in the captured image region ROI ($R_{all}$) 201 expressed as two-dimensional plane data.

The sensor observed values (pixel values) ($y_{all}$) 203 illustrated in FIG. 11 are values obtained by mapping the light from each position ($x_{all}$) of the sampling points set in the captured image region ROI ($R_{all}$) 201 expressed as two-dimensional plane data, that is, the emitted light ($\hat{x}_{all}$) 204 of the sampling points, after the light passes through the mask. Therefore, if there are values of the captured image region corresponding mask matrix ($M_{all}$) 202 and the sensor observed values (pixel values) ($y_{all}$) 203, the estimated values of the emitted light ($\hat{x}_{all}$) 204 of the sampling points can be obtained by calculation processes (processes a and b) illustrated below.

(Process a)

The pseudo-inverse matrix ($M^+_{all}$) of the captured image region corresponding mask matrix ($M_{all}$) calculated by the captured image region corresponding mask matrix ($M_{all}$) calculation unit 107 is calculated according to the following (Expression 1).

[Math. 1]

$$M_{all}^+ = (M_{all}^T M_{all})^{-1} M_{all}^T \qquad \text{(Expression 1)}$$

Note that $M^+_{all}$ represents a pseudo-inverse matrix of the captured image region corresponding mask matrix ($M_{all}$) and $M^T_{all}$ represents a transposed matrix of the captured image region corresponding mask matrix ($M_{all}$). In addition, $(M^T_{all} M_{all})^{-1}$ denotes an inverse matrix of $(M^T_{all} M_{all})$.

(Process b)

The pseudo-inverse matrix ($M^+_{all}$) of the captured image region corresponding mask matrix ($M_{all}$) and the sensor observed values (pixel values) ($y_{all}$) 203 are used, and the following (Expression 2) is used to calculate the estimated values of the emitted light ($\hat{x}_{all}$) 204 of the sampling points.

[Math. 2]

$$\hat{x}_{all} = M_{all}^+ y_{all} \qquad \text{(Expression 2)}$$

The (Expression 2) is equivalent to an expression obtained by using the pseudo-inverse matrix ($M^+$) of the matrix M to express the relational expression described above, that is, the relational expression $y = Mx$ of the case in which the light emitted from the P three-dimensional sampling points of the region to be imaged is written as the scene emitted light vector x of the length P, and the observed values of the image sensor corresponding to the number of pixels N that receive the light is set as the scene observed value vector y of the length N.

(Steps S208 and S209)

Next, in step S208, the image estimation unit 109 extracts light not included in the restored image region ROI ($R_{roi}$) in the emitted light ($\hat{x}_{all}$) 204 of the sampling points and sets the light as sampling point emitted light estimation values ($\hat{x}_{out}$) outside of the restored image region ROI ($R_{roi}$).

Furthermore, in step S209, the image estimation unit 109 obtains observed values ($\hat{y}_{out}$) corresponding to the sampling point emitted light estimation values ($\hat{x}_{out}$) outside of the restored image region ROI ($R_{roi}$).

Figure 12:
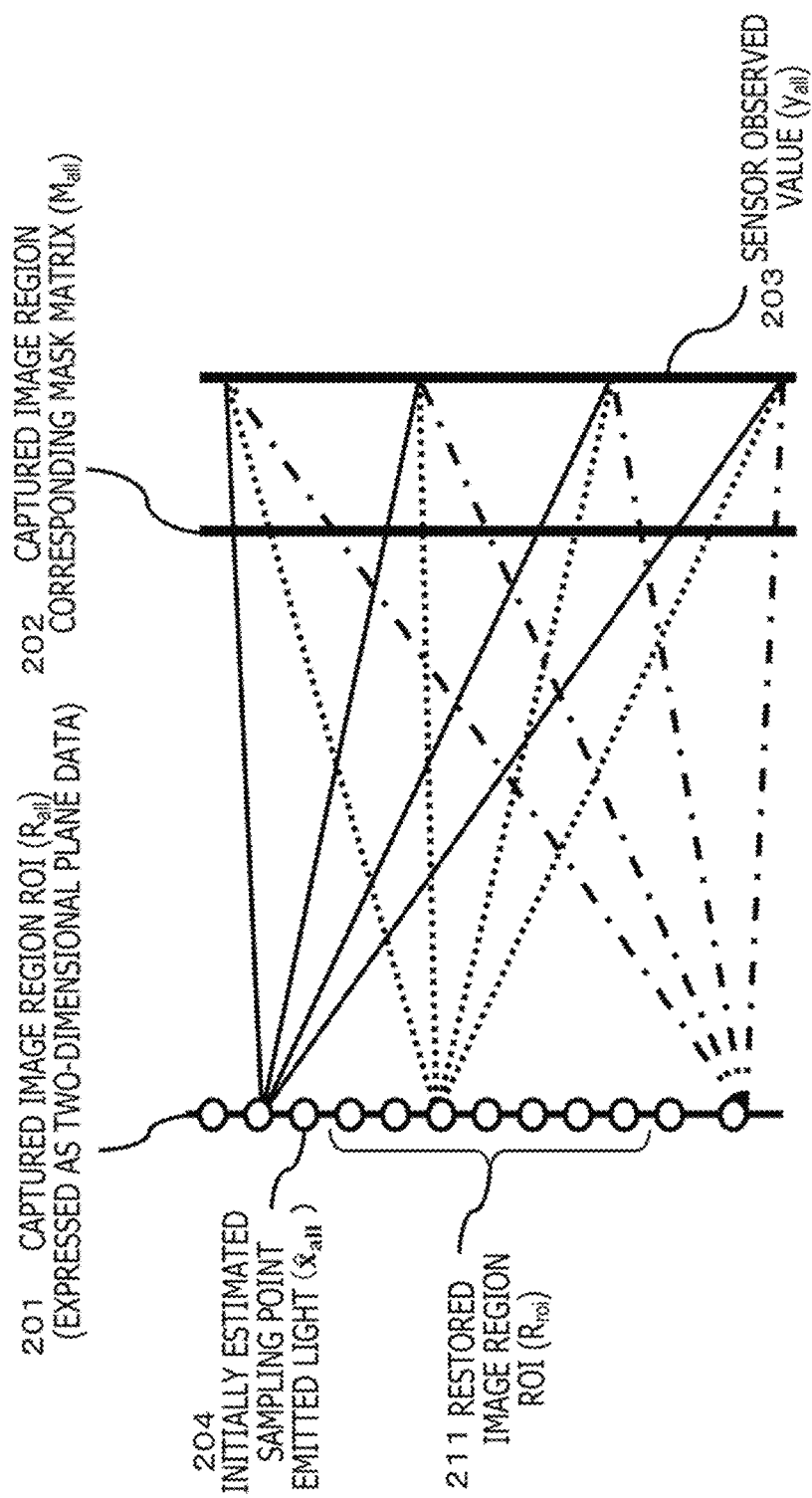
FIG. 12 is a diagram describing an example of the process executed by the image estimation unit.

FIG. 12 illustrates a setting example of a restored image region ROI ($R_{roi}$) 211. The restored image region ROI ($R_{roi}$) 211 can be freely set in the captured image region ROI ($R_{all}$). Note that in FIG. 12, the restored image region ROI ($R_{roi}$) 211 is also illustrated as two-dimensional data, similar to the captured image region ROI ($R_{all}$).

The details of the processes of steps S208 and S209 will be described. In step S208, the sampling points not included in the restored image region ROI ($R_{roi}$) 211 illustrated in FIG. 12 are extracted from the sampling point emitted light estimation values ($\hat{x}_{all}$) calculated according to the (Expression 2) described above, that is, the calculation formula of the sampling point emitted light estimation values ($\hat{x}_{all}$), and the sampling points are set as sampling point emitted light estimation values ($\hat{x}_{out}$) outside of the restored image region ROI ($R_{roi}$).

Next, in step S209, the observed values ($\hat{y}_{out}$) corresponding to the sampling point emitted light estimation values ($\hat{x}_{out}$) outside of the restored image region ROI ($R_{roi}$) are calculated by using the following (Expression 3).

[Math. 3]

$$\hat{y}_{out} = M_{all} \hat{x}_{out} \qquad \text{(Expression 3)}$$

The expression is an expression corresponding to the relational expression described above, that is, the relational expression $y = Mx$ of the case in which the light emitted from the P three-dimensional sampling points of the region to be imaged is written as the scene emitted light vector x of the length P, and the observed values of the image sensor corresponding to the number of pixels N that receive the light is set as the scene observed value vector y of the length N.

Figure 13:
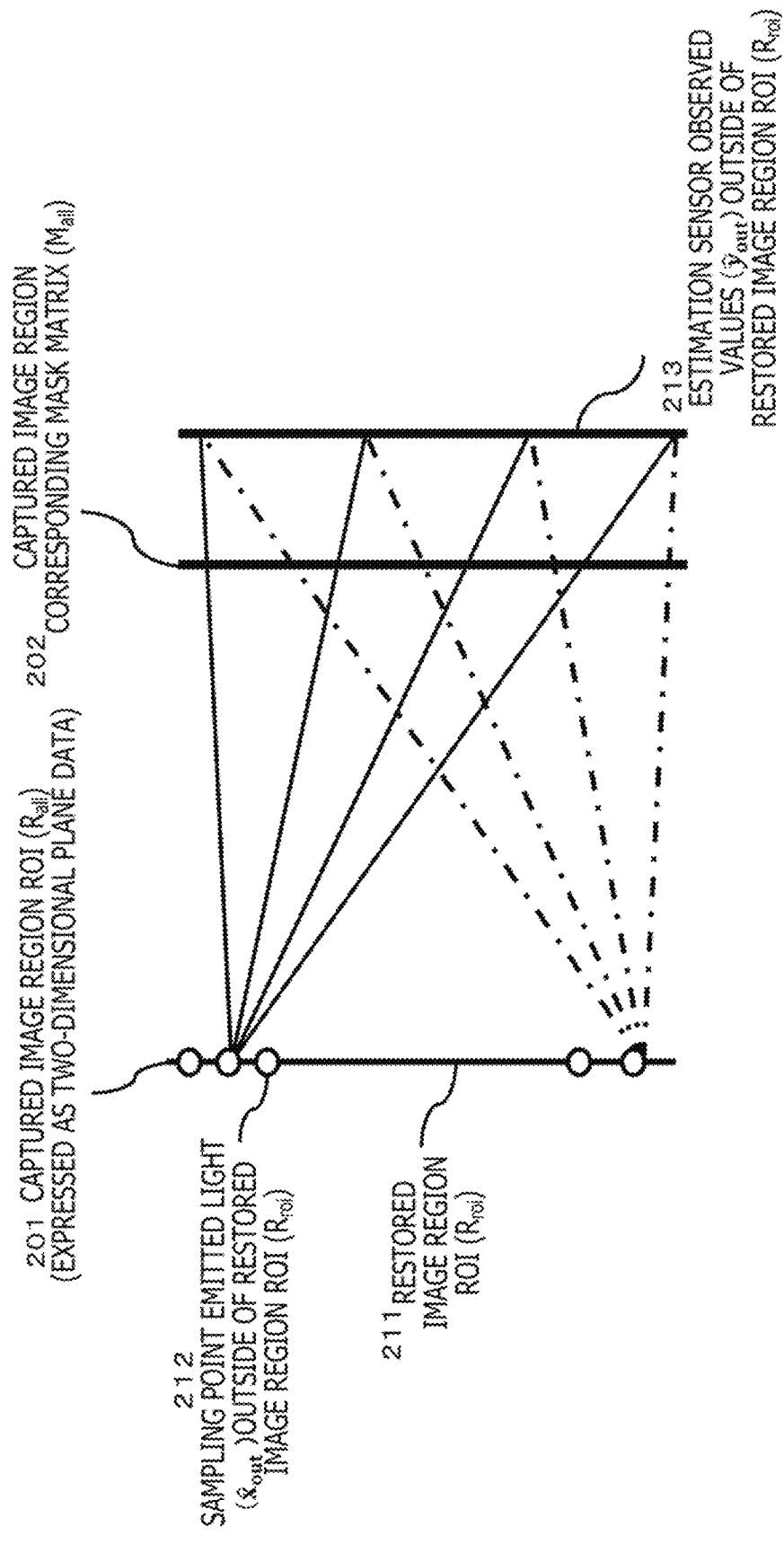
FIG. 13 is a diagram describing an example of the process executed by the image estimation unit.

FIG. 13 is a diagram illustrating the observed values ($\hat{y}_{out}$) corresponding to the sampling point emitted light estimation values ($\hat{x}_{out}$) outside of the restored image region ROI ($R_{roi}$) calculated in step S209.

FIG. 13 illustrates sampling point emitted light ($\hat{x}_{out}$) 212 outside of the restored image region ROI ($R_{roi}$) excluding the restored image region ROI ($R_{roi}$) 211 from the captured image region ROI ($R_{all}$) 201. The observed values ($\hat{y}_{out}$) corresponding to the sampling point emitted light ($\hat{x}_{out}$) 212 outside of the restored image region ROI ($R_{roi}$) are estimation sensor observed values ($\hat{y}_{out}$) 213 outside of the restored image region ROI ($R_{roi}$) illustrated in FIG. 13.

(Step S210)

Next, in step S210, the image estimation unit 109 obtains emitted light ($\hat{x}_{roi}$) estimated values of the sampling points in the restored image region ROI ($R_{roi}$).

First, from (a) the sensor observed values described with reference to FIG. 11, that is, the sensor observed values (pixel values) ($y_{all}$) 203 of the case in which the image sensor has received the emitted light ($\hat{x}_{all}$) 204 of the sampling points set in the captured image region ROI ($R_{all}$) 201, (b) the observed values ($\hat{y}_{out}$) corresponding to the sampling point emitted light estimation values ($\hat{x}_{out}$) outside of the restored image region ROI ($R_{roi}$) calculated in step S209 are subtracted. That is, a subtraction process $$(\hat{y}_{all}) - (\hat{y}_{out})$$

is used to obtain the observed values ($\hat{y}_{roi}$) of the case in which the light from the sampling points in the restored image region ROI ($R_{roi}$) is observed.

Next, emitted light ($\hat{x}_{roi}$) estimated values of the sampling points in the restored image region ROI ($R_{roi}$) are calculated according to the following (Expression 4).

[Math. 4]

$$\hat{x}_{roi} = M_{roi}^{+}(\hat{y}_{all} - \hat{y}_{out})$$

where $$M_{roi}^{+} = (M_{roi}^{T} M_{roi})^{-1} M_{roi}^{T} \quad \text{(Expression 4)}$$

Figure 14:
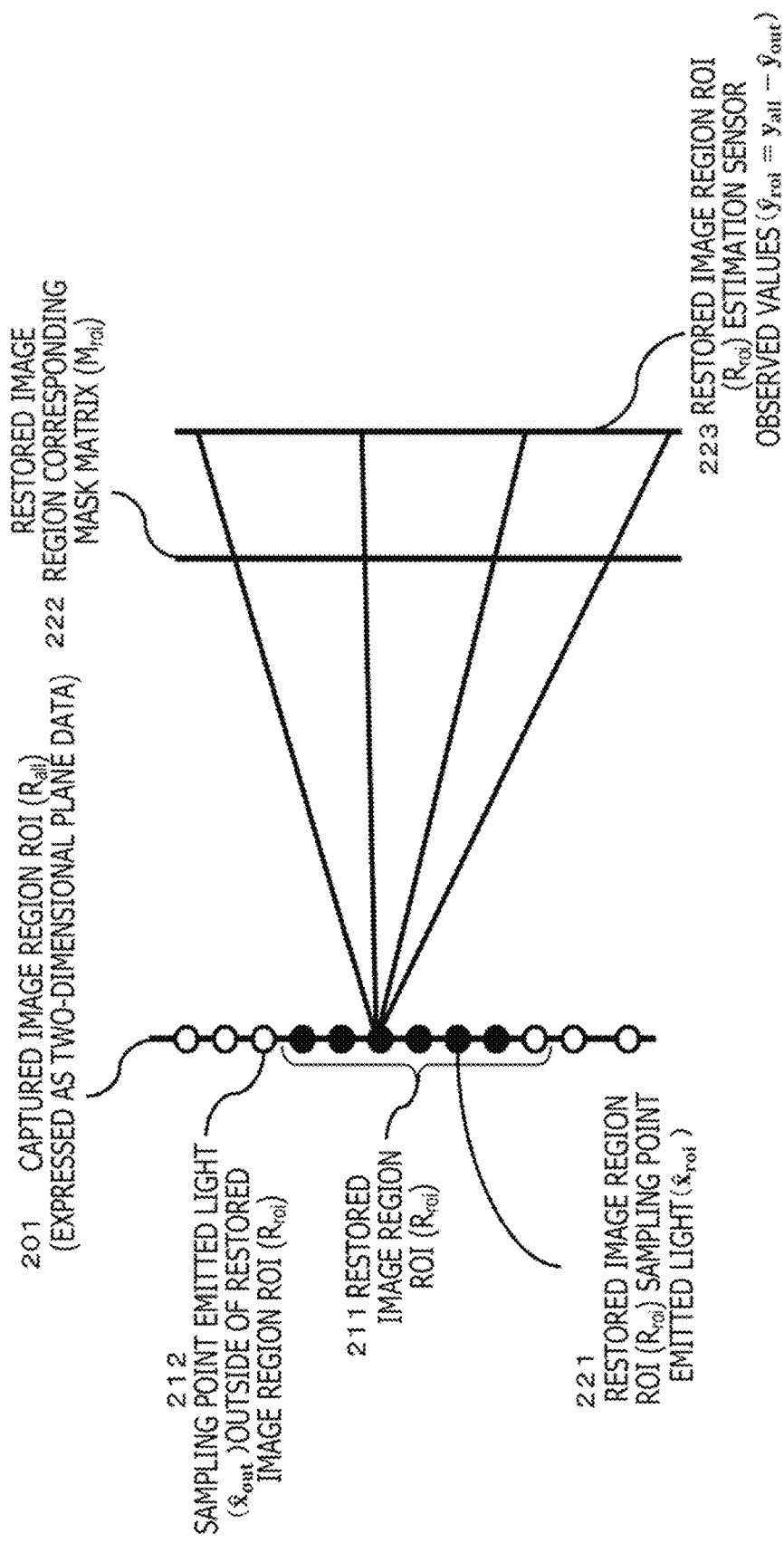
FIG. 14 is a diagram describing an example of the process executed by the image estimation unit.

FIG. 14 is a diagram describing a process of calculating the emitted light ($\hat{x}_{roi}$) estimated values of the sampling points in the restored image region ROI ($R_{roi}$). FIG. 14 illustrates emitted light of the sampling points in the restored image region ROI ($R_{roi}$) 211 set in the captured image region ROI ($R_{all}$) 201, that is, sampling point emitted light ($\hat{x}_{roi}$) 221 inside of the restored image region ROI ($R_{roi}$) and illustrates observed values of the image sensor that receives the emitted light through a mask defined by a restored image region corresponding mask matrix ($M_{roi}$) 222, that is, restored image region ROI ($R_{roi}$) estimation sensor observed values ($\hat{y}_{roi} = \hat{y}_{all} - \hat{y}_{out}$) 223.

In this way, the image estimation unit 109 obtains the emitted light ($\hat{x}_{roi}$) estimated values of the sampling points in the restored image region ROI ($R_{roi}$) according to the (Expression 4). The estimated values are specifically equivalent to the pixel values of the image (restored image) illustrating the object in the restored image region ROI ($R_{roi}$).

As described above, the image estimation unit 109 generates the restored image of the restored image region including part of the captured image region of the lensless camera 102 in the following process.

(S206) The image estimation unit 109 calculates the pseudo-inverse matrix of the captured image region corresponding mask matrix applied to generate the restored image of the entire imaging range of the lensless camera 102.

(S207) The image estimation unit 109 uses the pseudo-inverse matrix of the captured image region corresponding mask matrix and the observed image signals to calculate the emitted light estimation values of the sampling points in the captured image region.

(S208 to S210) The image estimation unit 109 subtracts the observed image signals outside of the restored image region not included in the restored image region from the observed image signals as output of the image sensor of the lensless camera 102 to calculate the observed image signals inside of the restored region and executes arithmetic processing of the observed image signals inside of the restored region and the pseudo-inverse matrix of the restored image region corresponding mask matrix to generate the restored image of the restored image region including part of the captured image region of the lensless camera 102.

Note that the pseudo-inverse matrix used in the processes may be an inverse matrix.

[6. Example of Setting Sampling Points and Example of Generating Image]

Figure 15:
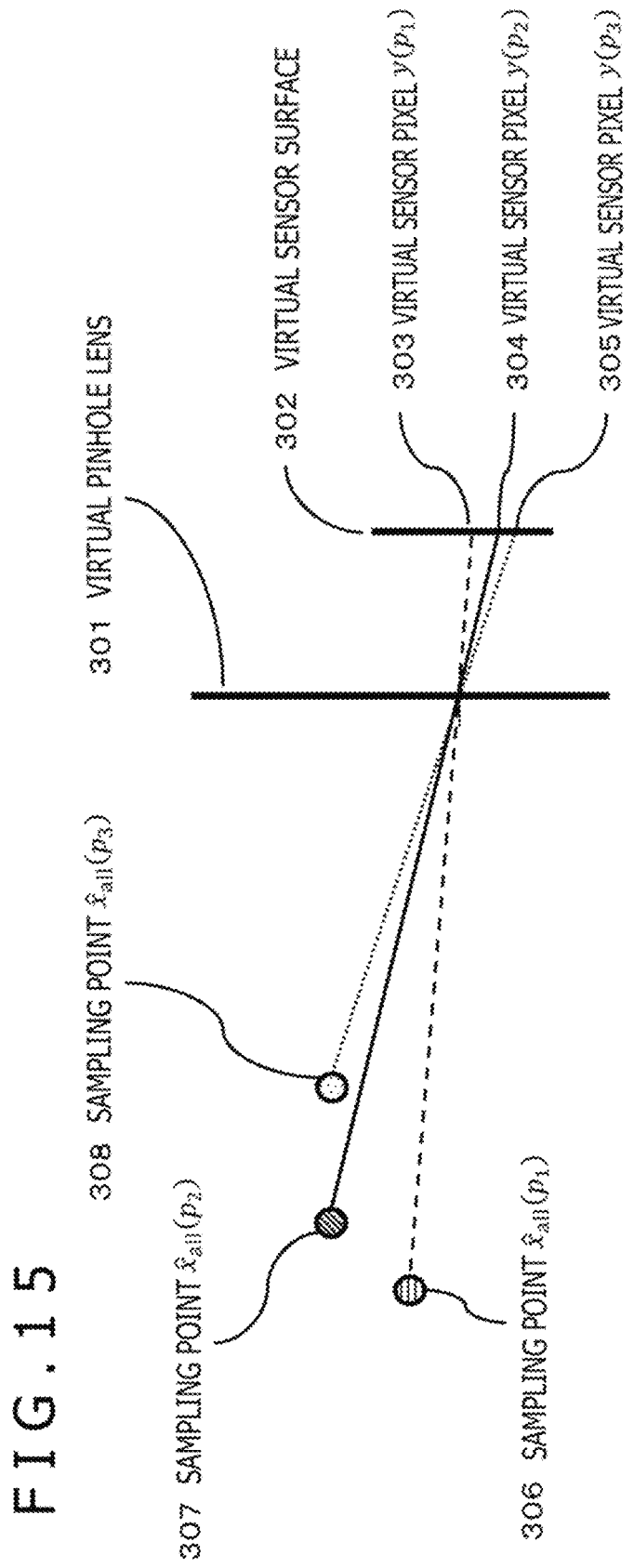
FIG. 15 is a diagram describing setting of sampling points and a captured image.

In FIGS. 11 to 14 described above, the captured image region ROI ($R_{all}$) and the restored image region ROI ($R_{roi}$) are illustrated as two-dimensional plane data to facilitate the understanding of the description. As described above, the regions may be expressed as actual three-dimensional spaces. In general, the sampling points can be arranged at arbitrary three-dimensional positions. FIG. 15 is a diagram illustrating an example of a method of reconstructing a two-dimensional image from luminance values of three-dimensional sampling points.

A virtual pinhole lens 301 and a virtual sensor surface 302 are prepared. Light beams, that is, $\hat{x}_{all}(p_1)$,
$\hat{x}_{all}(p_2)$, and
$\hat{x}_{all}(p_3)$ from sampling points 305, 306, and 307 pass through the virtual pinhole lens 301 and intersect the virtual sensor surface 302.

Observed values (pixel values) according to the incident light, that is, observed values (pixel values) including a virtual sensor pixel $y(p_1)$ 303,
a virtual sensor pixel $y(p_2)$ 304, and
a virtual sensor pixel $y(p_3)$ 305 can be obtained at virtual sensor pixels 303, 304, and 305 on the virtual sensor surface 302, respectively. In this case, the sampling points are in focus in the reproduced image regardless of the distance from the sampling points.

Figure 16:
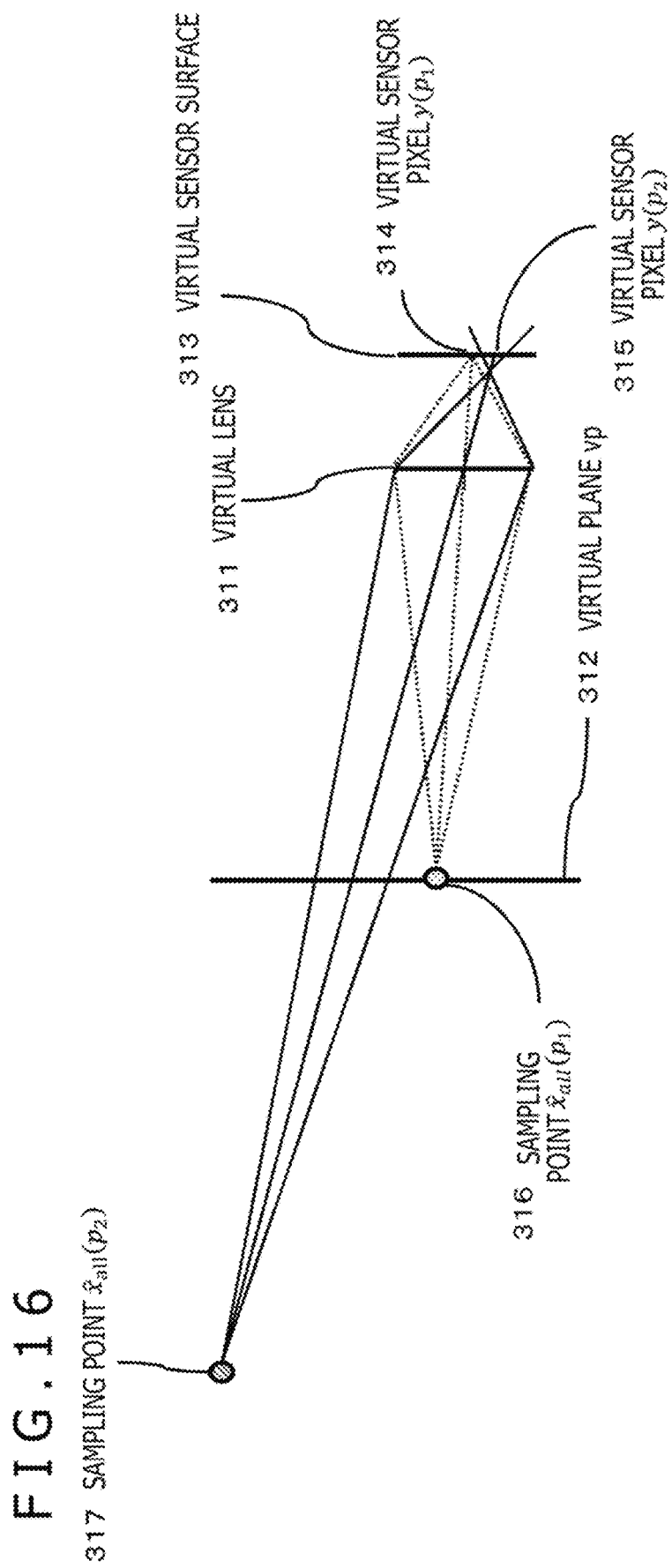
FIG. 16 is a diagram describing the setting of the sampling points and the captured image.

In addition, FIG. 16 illustrates an example of a method of reconstructing an image with lens bokeh in the depth direction. FIG. 16 illustrates a virtual lens 311, a virtual sensor surface 313, and a virtual plane 312 with which an image is focused at the virtual sensor surface 313. In this configuration, light beams, that is, $\hat{x}_{all}(p_1)$ and
$\hat{x}_{all}(p_2)$ from sampling points 316 and 317 pass through the virtual lens 311, and the light beams are mapped on the virtual sensor surface 313. Pixel values on the virtual sensor 313, that is, values including a virtual sensor pixel $y(p_1)$ 314 and
a virtual sensor pixel $y(p_2)$ 315 can be combined on the virtual sensor surface 313 to reproduce an image with lens bokeh in the depth direction.

Figure 17:
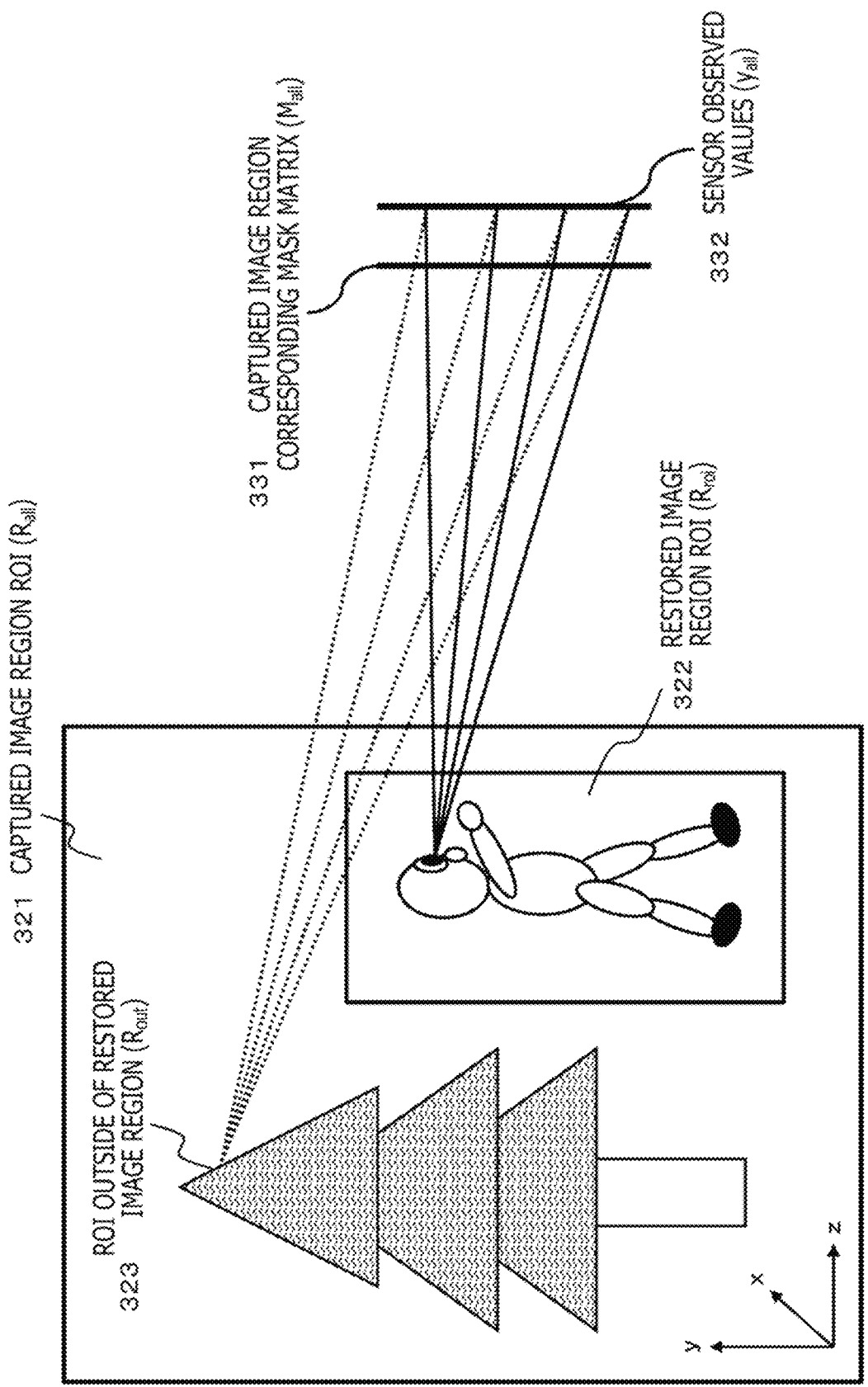
FIG. 17 is a diagram describing the setting of the sampling points and the captured image.

FIG. 17 illustrates a diagram of a three-dimensionally set ROI region. The ROI region can be set at an arbitrary three-dimensional position, and the sampling points can be partially reproduced. For example, regions including a captured image region ROI ($R_{all}$) 321,
a restored image region ROI ($R_{roi}$) 322, and
an ROI ($R_{out}$) 323 outside of the restored image region can be set in the three-dimensional space as illustrated in FIG. 17, and the sampling points can be freely set in each region.

The emitted light from each sampling point enters the image sensor through a mask with conversion characteristics (transmission function) according to a captured image region corresponding mask matrix ($M_{all}$) 331 illustrated for example in FIG. 17, and sensor observed values ($y_{all}$) 332 can be observed.

For example, as illustrated in FIG. 17, the restored image region ROI ($R_{roi}$) 322 can be set as a region with a person, and a background removed image including only the person and excluding the background region can be generated as a restored image.

[7. Example of Generation Process of Image with Partially Improved Resolution]

A process of the present disclosure can be executed to generate an image with partially improved resolution. A generation process of an image with partially improved resolution will be described with reference to FIGS. 18A and 18B.

In a normal camera captured image, the pixel pitch on the screen is constant, and the resolution on one image is constant in any region of the image. In the process of the present disclosure, instead of using uniform sampling points, the density of the sampling points can be changed in each region, for example. In this way, the resolution can be changed region-by-region.

Figure 18B:
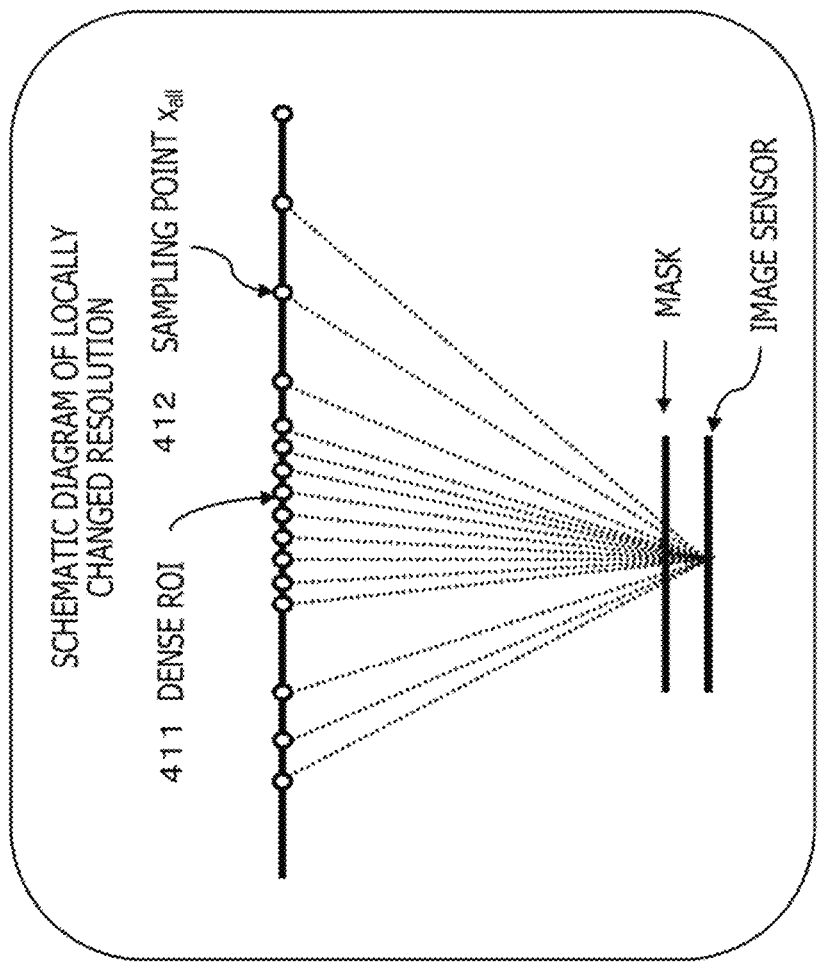
FIGS. 18A and 18B are diagrams describing setting of sampling points for acquiring an image with locally changed resolution and a captured image.
Figure 18A:
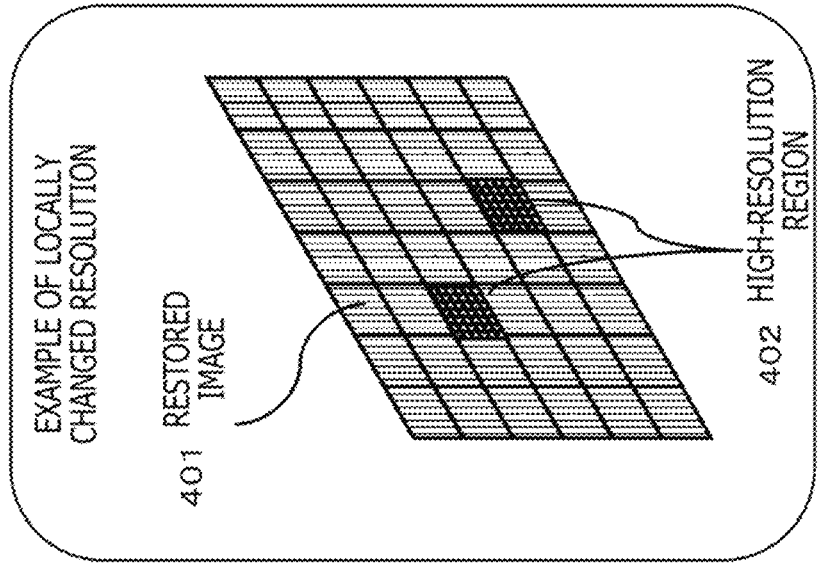

For example, as in a restored image 401 illustrated in FIG. 18A, a process of setting part of the image as high-resolution regions 402 can be executed. To generate such an image, it is sufficient that the density of the sampling points corresponding to the high-resolution regions 402 is set higher than the other regions.

FIG. 18B illustrates an example in which the density of the sampling points is changed. The density of sampling points 412 in a dense ROI 411 is higher than other regions. The sampling points correspond to pixel value calculation positions in the restored image, and increasing the density of the sampling points increases the density of the pixel values. As a result, a high-resolution image can be generated.

FIG. 19 illustrates an example of an image with locally changed resolution. The example illustrated in FIG. 19 is a processing example of generating an image in which the resolution is increased only in a region with a person. First, sampling point emitted light ($\hat{x}_{all}$) of the entire scene, that is, captured image region sampling point emitted light ($\hat{x}_{all}$) 421, is estimated to generate an image of the entire captured image region. Furthermore, a region with a person is detected from the image, and the detected region is set as a high-resolution region ($R_{roi}$) 422.

Next, a simulation is performed to calculate a mask matrix ($M_{roi}$) in a state in which the density of the sampling points of only the high-resolution region ($R_{roi}$) 422 is higher than the other regions. The sampling point emitted light of the case of using the mask with characteristics (transmission function) of the mask matrix ($M_{roi}$) is calculated. As a result of the process, a partial region high-resolution image 431 is generated, in which the resolution of only the region with a person is increased.

In this way, the signal processing unit 109 can execute the process by setting the density of the sampling points in the restored image region higher than the density of the sampling points of the other regions in the image captured by the lensless camera 102. The signal processing unit 109 can generate a partial region high-resolution image in which the resolution of only the restored image region is increased.

[8. Processing Example of Dispersing Emitted Light from Sampling Points in Wavelength Direction]

Next, a processing example of dispersing the emitted light from the sampling points in the wavelength direction will be described. Specifically, the process is, for example, a process of observing the emitted light of each sampling point by separating the emitted light into wavelength light beams corresponding to the colors of RGB. The process can be executed to generate a color image.

FIG. 20 illustrates a schematic diagram in expanding the emitted light from the sampling points. In separating the emitted light from P sampling points 471 into L wavelengths, the emitted light of an lth wavelength emitted from a pth sampling point can be represented as follows.

$$x_{col}(pL+l) \quad \text{(Expression a)}$$

Note that for example, when the emitted light from the sampling point is separated into three wavelengths (R, G, B), L equals to 3, and l equals to 0 to 2.

An observed value observed after the emitted light enters an nth pixel of N constituent pixels of an image sensor 473 through a mask 472 can be expressed as follows.

$$y_{col}(nL+l) \quad \text{(Expression b)}$$

The relationship between (Expression a) and (Expression b) can be represented as follows.

$$y_{col} = M_{col} \times x_{col} \quad \text{(Expression c)}$$

In the (Expression c), $M_{col}$ is an NL×PL matrix (mask matrix of mask 472), where (N) represents the number of pixels of the image sensor 473, (L) represents the number of separated wavelength light beams of the emitted light from the sampling points, and (P) represents the number of sampling points.

The matrix can be obtained by simulating the observed values of the emitted light at different wavelengths from one sampling point.

As a result, the luminance separated into each emitted light ($x_{col}$) wavelength of sampling points 501 can be reproduced from the observed values $y_{col}$ on the image sensor 473. For example, the output values of the colors of RGB can be acquired to reproduce a color image. Note that similar expansion can also be performed for the polarization as in the case of the wavelength.

In this way, the signal processing unit 109 can execute the process by partitioning the wavelength of the emitted light of the sampling points in the restored image region to thereby generate a restored image in a plurality of different wavelength light units. The signal processing unit 109 can also execute the process by partitioning the polarized components of the emitted light of the sampling points in the restored image region to thereby generate a restored image in a plurality of different polarized component units.

[9. Advantageous Effects of Image Processing of Present Disclosure]

The process executed by the image processing apparatus of the present disclosure can attain the following advantageous effects. Functions, such as non-mechanical zoom, non-mechanical pan, and removal of background, can be realized at high resolution and low amount of calculation without adding hardware to the lensless camera. Furthermore, the resolution of an unimportant region can be reduced to reduce the amount of calculation without changing the resolution of an important region, or conversely, the resolution of the important region can be improved while maintaining the amount of calculation. The process of the present disclosure is also effective for an image, such as a far-infrared image, using a wavelength other than visible light.

[10. Example of Hardware Configuration of Image Processing Apparatus]

Next, an example of a hardware configuration of an image processing apparatus will be described with reference to FIG. 21. The hardware described with reference to FIG. 21 is an example of the hardware configuration of the image processing apparatus that executes the process of the signal processing unit 101 described above with reference to FIG. 7.

A CPU (Central Processing Unit) 501 functions as a control unit or a data processing unit that executes various processes according to a program stored in a ROM (Read Only Memory) 502 or a storage unit 508. For example, the CPU 501 executes the processes according to the sequences described in the embodiment. The program executed by the CPU 501, data, and the like are stored in a RAM (Random Access Memory) 503. The CPU 501, the ROM 502, and the RAM 503 are connected to each other through a bus 504.

The CPU 501 is connected to an input-output interface 505 through a bus 504, and an input unit 506 including various switches, a keyboard, a mouse, a microphone, a sensor, and the like and an output unit 507 including a display, a speaker, and the like are connected to the input-output interface 505. The CPU 501 executes various processes according to commands input from the input unit 506 and outputs processing results to, for example, the output unit 507.

The storage unit 508 connected to the input-output interface 505 includes, for example, a hard disk or the like and stores the program executed by the CPU 501 and various data. A communication unit 509 functions as a transmission and reception unit of Wi-Fi communication, Bluetooth (registered trademark) (BT) communication, and other data communication through a network, such as the Internet and a local area network, and communicates with an external apparatus.

A drive 510 connected to the input-output interface 505 drives a removable medium 511, such as a magnetic disk, an optical disk, a magneto-optical disk, and a semiconductor memory like a memory card, to record or read data.

[11. Conclusion of Configuration of Present Disclosure]

The embodiment of the present disclosure has been described in detail with reference to a specific embodiment. However, it is obvious that those skilled in the art can modify or replace the embodiment without departing from the scope of the present disclosure. That is, the present invention has been disclosed illustratively, and the present invention should not be interpreted restrictively. To determine the scope of the present disclosure, the section of the claims should be considered.

Note that the technique disclosed in the present specification can be configured as follows.

(1)

An image processing apparatus including:

a signal processing unit that receives observed image signals as output of an image sensor of a lensless camera to generate a restored image of a restored image region including part of a captured image region of the lensless camera, in which the signal processing unit generates the restored image by executing arithmetic processing of observed image signals in a restored region generated by subtracting observed image signals not included in the restored image region from the observed image signals and an inverse matrix or a pseudo-inverse matrix of a matrix applied to generate the restored image.

(2)

The image processing apparatus according to (1), in which the signal processing unit includes a restored image region corresponding matrix calculation unit that generates a matrix applied to generate the restored image based on correspondence information of emitted light from sampling points in the restored image region and observed values of the image sensor.

(3)

The image processing apparatus according to (1) or (2), in which the signal processing unit includes a restored image region corresponding matrix calculation unit that generates a matrix applied to generate the restored image of P×N defined by the number of sampling points (P) in the restored image region and the number of pixels (N) of the lensless camera.

(4)

The image processing apparatus according to any one of (1) to (3), in which the signal processing unit includes an image estimation unit that generates the restored image by executing arithmetic processing of observed image signals in the restored region, the observed image signals being calculated by subtracting the observed image signals not included in the restored image region from emitted light estimation values of sampling points in the captured image region calculated based on an inverse matrix of a matrix applied to generate a restored image of an entire imaging range of the lensless camera and based on the observed image signals, and an inverse matrix of the matrix applied to generate the restored image of the entire imaging range of the lensless camera.

(5)

The image processing apparatus according to any one of (1) to (4), in which the signal processing unit further includes a captured image region corresponding mask matrix calculation unit that generates a matrix applied to the captured image region based on correspondence information of emitted light from sampling points in the captured image region and the observed values of the image sensor.

(6)

The image processing apparatus according to any one of (1) to (5), in which the signal processing unit sets density of the sampling points in the restored image region to density higher than density of the sampling points of other regions of the captured image to generate the restored image at high resolution.

(7)

The image processing apparatus according to any one of (1) to (6), in which the signal processing unit partitions wavelength of the emitted light of the sampling points in the restored image region to generate a restored image in a plurality of different wavelength light units.

(8)

The image processing apparatus according to any one of (1) to (7), in which the signal processing unit partitions polarized components of the emitted light of the sampling points in the restored image region to generate a restored image in a plurality of different polarized component units.

(9)

An imaging apparatus including:

a mask in which transmission regions and non-transmission regions of light are set as a two-dimensional pattern;

an imaging unit including an image sensor that receives the light through the mask; and a signal processing unit that receives observed image signals as output of the image sensor to generate a restored image of a restored image region including part of a captured image region of the imaging unit, in which the signal processing unit generates the restored image by executing arithmetic processing of observed image signals in a restored region generated by subtracting observed image signals not included in the restored image region from the observed image signals and an inverse matrix or a pseudo-inverse matrix of a matrix applied to generate the restored image.

(10)

An image processing method executed by an image processing apparatus, in which the image processing apparatus includes a signal processing unit that receives observed image signals as output of an image sensor of a lensless camera to generate a restored image of a restored image region including part of a captured image region of the lensless camera, and the signal processing unit generates the restored image by executing arithmetic processing of observed image signals in a restored region generated by subtracting observed image signals not included in the restored image region from the observed image signals and an inverse matrix or a pseudo-inverse matrix of a matrix applied to generate the restored image.

In addition, the series of processes described in the specification can be executed by hardware, software, or a composite component of the hardware and the software. In the case where the processes are executed by the software, a program recording the processing sequence can be executed by installing the program in a memory of a computer incorporated into dedicated hardware, or the program can be executed by installing the program in a general-purpose computer that can execute various processes. For example, the program can be recorded in advance in a recording medium. Other than installing the program in the computer from the recording medium, the program can be received through a network, such as a LAN (Local Area Network) and the Internet, and the program can be installed in a recording medium, such as a built-in hard disk.

Note that various processes described in the specification may not be executed in chronological order described above, and the processes may be executed in parallel or individually according to the capabilities of the apparatuses that execute the processes or as necessary. In addition, the system in the present specification denotes logical set configurations of a plurality of apparatuses, and the apparatuses of the configurations may not be in the same housing.

INDUSTRIAL APPLICABILITY

As described above, according to the configuration of the embodiment of the present disclosure, the field of view of the captured image of the lensless camera can be controlled, and the configuration for generating the restored image including part of the imaging region is realized.

REFERENCE SIGNS LIST

80 Lensless camera
81 Image sensor
82 Mask
83 Signal processing unit
100 Image processing apparatus
101 Signal processing unit
102 Lensless camera
103 Restored image region corresponding ROI information
104 Captured image region corresponding ROI information
105 Mask information
106 Camera configuration information
107 Captured image region corresponding mask matrix calculation unit
108 Restored image region corresponding mask matrix calculation unit
109 Image estimation unit
501 CPU
502 ROM
503 RAM
504 Bus
505 Input-output interface
506 Input unit
507 Output unit
508 Storage unit
509 Communication unit
510 Drive
511 Removable medium

The invention claimed is:

1. An image processing apparatus, comprising:
a signal processing unit that receives observed image signals as output of an image sensor of a lensless camera to generate a restored image of a restored image region including part of a captured image region of the lensless camera, wherein
the signal processing unit generates the restored image by executing the arithmetic processing of observed image signals in a restored region generated by subtracting observed image signals not included in the restored image region from the observed image signals and executing the arithmetic processing of the observed image signals in the restored region and an inverse matrix or a pseudo-inverse matrix of an applied matrix to generate the restored image.

2. The image processing apparatus according to claim 1, wherein
the signal processing unit includes a restored image region corresponding matrix calculation unit that generates a matrix applied to generate the restored image based on correspondence information of emitted light from sampling points in the restored image region and observed values of the image sensor.

3. The image processing apparatus according to claim 1, wherein
the signal processing unit includes a restored image region corresponding matrix calculation unit that generates a matrix applied to generate the restored image of P×N defined by the number of sampling points (P) in the restored image region and the number of pixels (N) of the lensless camera.

4. The image processing apparatus according to claim 1, wherein
the signal processing unit includes an image estimation unit that generates the restored image by executing the arithmetic processing of observed image signals in the restored region, the observed image signals being calculated by subtracting the observed image signals not included in the restored image region from emitted light estimation values of sampling points in the captured image region calculated based on an inverse matrix of a matrix applied to generate a restored image of an entire imaging range of the lensless camera and based on the observed image signals, and an inverse matrix of the matrix applied to generate the restored image of the entire imaging range of the lensless camera.

5. The image processing apparatus according to claim 1, wherein
the signal processing unit further includes a captured image region corresponding mask matrix calculation unit that generates a matrix applied to the captured image region based on correspondence information of emitted light from sampling points in the captured image region and observed values of the image sensor.

6. The image processing apparatus according to claim 1, wherein
the signal processing unit sets density of sampling points in the restored image region to density higher than density of sampling points of other regions of a captured image to generate the restored image at high resolution.

7. The image processing apparatus according to claim 1, wherein
the signal processing unit partitions wavelength of emitted light of sampling points in the restored image region to generate a restored image in a plurality of different wavelength light units.

8. The image processing apparatus according to claim 1, wherein
the signal processing unit partitions polarized components of emitted light of sampling points in the restored image region to generate a restored image in a plurality of different polarized component units.

9. An imaging apparatus, comprising:
a mask in which transmission regions and non-transmission regions of light are set as a two-dimensional pattern;
an imaging unit including an image sensor that receives the light through the mask; and
a signal processing unit that receives observed image signals as output of the image sensor to generate a restored image of a restored image region including part of a captured image region of the imaging unit, wherein
the signal processing unit generates the restored image by executing arithmetic processing of observed image signals in a restored region generated by subtracting observed image signals not included in the restored image region from the observed image signals and executing the arithmetic processing of the observed image signals in the restored region and an inverse matrix or a pseudo-inverse matrix of an applied matrix to generate the restored image.

10. An image processing method executed by an image processing apparatus, wherein
the image processing apparatus includes a signal processing unit that receives observed image signals as output of an image sensor of a lensless camera to generate a restored image of a restored image region including part of a captured image region of the lensless camera, and
the signal processing unit generates the restored image by executing arithmetic processing of observed image signals in a restored region generated by subtracting observed image signals not included in the restored image region from the observed image signals and executing the arithmetic processing of the observed image signals in the restored region and an inverse matrix or a pseudo-inverse matrix of an applied matrix to generate the restored image.

* * * * *